US006393667B1

(12) United States Patent
Slavik et al.

(10) Patent No.: US 6,393,667 B1
(45) Date of Patent: May 28, 2002

(54) MACHINE WITH A DRAFTING ARRANGEMENT FOR PROCESSING TEXTILE MATERIAL

(75) Inventors: Walter Slavik, Fehraltdorf; Viktor Pietrini, Sirnach; Beat Näf, Jona; Jürg Faas, Andelfingen; Christian Müller, Winterthur, all of (CH)

(73) Assignee: Maschinenfabrik Rieter AG, Winterthur (CH)

( * ) Notice: Subject to any disclaimer, the term of this patent is extended or adjusted under 35 U.S.C. 154(b) by 0 days.

(21) Appl. No.: 09/700,045

(22) PCT Filed: May 12, 1999

(86) PCT No.: PCT/CH99/00201

§ 371 (c)(1),
(2), (4) Date: Mar. 5, 2001

(87) PCT Pub. No.: WO99/58749

PCT Pub. Date: Nov. 18, 1999

(30) Foreign Application Priority Data

May 13, 1998 (CH) ................................................ 1063/98
May 29, 1998 (CH) ................................................ 1182/98

(51) Int. Cl.⁷ ................................................ D01H 5/00

(52) U.S. Cl. ............................... 19/236; 19/150; 19/240

(58) Field of Search ........................ 19/0.2, 0.22, 0.23, 19/65 A, 115 R, 150, 157, 236, 238, 239, 240, 243, 258, 260

(56) References Cited

U.S. PATENT DOCUMENTS

| | | | | |
|---|---|---|---|---|
| 3,402,433 A | * | 9/1968 | Schwalm ...................... | 19/150 |
| 3,703,023 A | * | 11/1972 | Krauss et al. ................. | 19/240 |
| 4,100,649 A | * | 7/1978 | Erismann et al. ............. | 19/240 |
| 4,768,262 A | * | 9/1988 | Gunter ........................ | 19/258 |
| 4,947,947 A | * | 8/1990 | White ......................... | 73/160 |
| 4,974,296 A | * | 12/1990 | Vidler ......................... | 19/239 |
| 5,014,395 A | | 5/1991 | Stäheli et al. | |
| 5,018,248 A | * | 5/1991 | Haworth et al. ............... | 19/240 |
| 5,023,976 A | * | 6/1991 | Meyer et al. .................. | 19/243 |
| 5,152,033 A | * | 10/1992 | White ......................... | 19/240 |
| 5,161,284 A | * | 11/1992 | Leifeld ........................ | 19/260 |
| 5,233,728 A | | 8/1993 | Whiteley et al. | |
| 5,274,883 A | * | 1/1994 | Eke ............................ | 19/236 |
| 5,313,689 A | | 5/1994 | Oexler | |
| 5,384,934 A | * | 1/1995 | Dammig ...................... | 19/239 |
| 5,400,476 A | * | 3/1995 | White ......................... | 19/239 |
| 5,428,870 A | * | 7/1995 | Rutz et al. .................... | 19/240 |
| 5,463,556 A | * | 10/1995 | Denz ........................... | 19/239 |
| 5,502,875 A | | 4/1996 | Stolz et al. | |
| 5,528,797 A | | 6/1996 | Otmar et al. | |
| 5,535,488 A | * | 7/1996 | Yao et al. ..................... | 19/243 |
| 5,611,115 A | * | 3/1997 | Faas ............................ | 19/98 |
| 5,915,509 A | * | 6/1999 | Faas et al. ..................... | 19/98 |
| 5,943,740 A | * | 8/1999 | Slavik et al. .................. | 19/239 |

FOREIGN PATENT DOCUMENTS

| | | |
|---|---|---|
| CH | 462682 | 10/1968 |
| DD | 224626 | 7/1985 |
| DE | 2230069 | 1/1973 |
| DE | 4142038 | 6/1993 |

(List continued on next page.)

OTHER PUBLICATIONS

International Search Report dated Sep. 17, 1999.

*Primary Examiner*—Peter Nerbun
*Assistant Examiner*—Gary L. Welch
(74) *Attorney, Agent, or Firm*—Dority & Manning

(57) ABSTRACT

A machine (28, 201, K, 400) for processing textile material with at least one sliver-forming device (209, 41) and a coiler (42, KA) is provided with a drafting arrangement (2, 110, 213) in such a way that at least the coiler (42, KA) is formed by a subassembly of a draw frame (1, S) for doubling and drafting slivers (40, F, 52, 120), with the subassembly (1, S) also comprising the drafting arrangement (2, 213) of the draw frame.

25 Claims, 11 Drawing Sheets

FOREIGN PATENT DOCUMENTS

| | | |
|---|---|---|
| DE | 4233357 | 4/1994 |
| DE | 4324948 | 1/1995 |
| DE | 4324951 | 1/1995 |
| DE | 4416911 | 11/1995 |
| DE | 4424490 | 1/1996 |
| DE | 19509781 | 9/1996 |
| DE | 19609781 | 10/1996 |
| DE | 19548840 | 7/1997 |
| DE | 29622923 | 9/1997 |
| DE | 19721758 | 1/1998 |
| DE | 19738053 | 9/1999 |
| EP | 186741 | 10/1985 |
| EP | 312774 | 9/1988 |
| EP | 349866 | 6/1989 |
| EP | 376002 | 12/1989 |
| EP | 678601 | 6/1991 |
| EP | 478992 | 9/1991 |
| EP | 608508 | 11/1993 |
| EP | 0627509 | 5/1994 |
| EP | 627509 | 5/1994 |
| EP | 846795 | 10/1997 |
| JP | 60155730 | 8/1985 |

\* cited by examiner

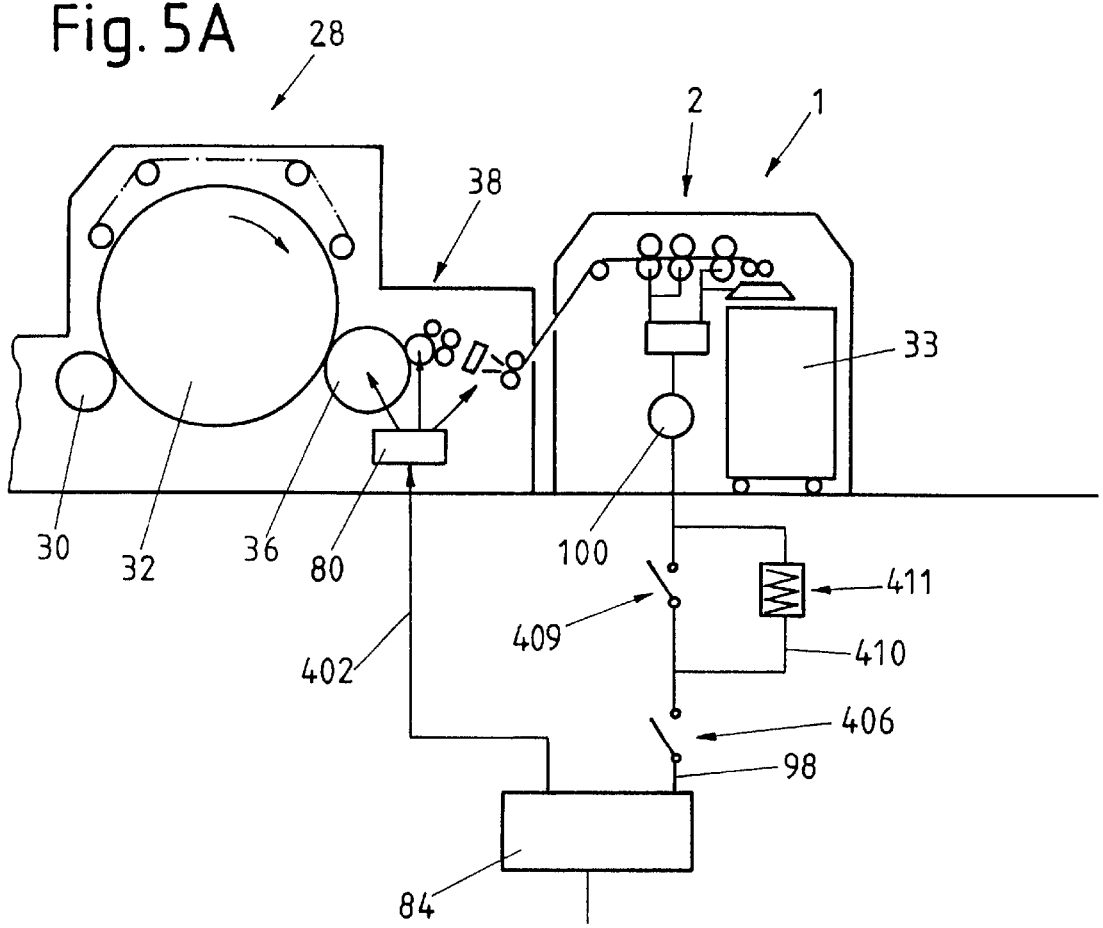
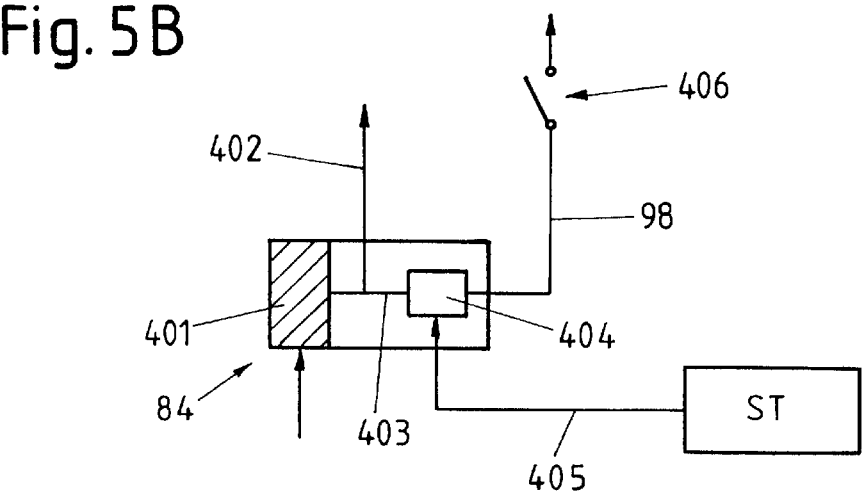

MACHINE WITH A DRAFTING ARRANGEMENT FOR PROCESSING TEXTILE MATERIAL

The invention relates to a machine for processing textile material with at least one sliver-forming device and a coiler and at least one drafting arrangement between the sliver-forming device and the coiler (can press, can coiler).

Such arrangements are known for example from EP-A-376 002, EP-B-640 704, EP-A-799 916, DE-A-195 09 781, DE-A-197 21 758, DE-A-296 22 923 and U.S. Pat. No. 3,402,433. It is known for example to provide a combing machine with a regulated drafting arrangement as is shown in the aforementioned specification EP-A-376 002. The cited DE-A-197 21 758 further discloses an apparatus in which a carding machine can comprise a drive for the sliver-supplying elements and the draw frame or the coiler.

Also known are so-called draw frames for doubling and drawing slivers which can be produced by carding or combing machines. The most essential component of such a machine is the drafting arrangement. Examples of such draw frames are disclosed in DE-A-195 48 840, EP-A-608 502, DE-A44 24 490 and DE-A41 42 038. The "doubling" means that such machines are designed for drawing in and processing several slivers (e.g. six or eight slivers), with the overall draft of the drafting arrangement usually being adjusted to the number of incoming slivers.

SUMMARY

Ojects and advantages of the invention will be set forth in part in the following description, or may be obvious fromthe description, or may be learned through practice of the invention.

The present invention provides a machine for processing textile material with a drafting arrangement and a coiler, with the drafting arrangement being formed by a subassembly of a draw frame for the doubling and drawing of several slivers. If the textile machine concerns a carding machine, only one (or not more than two slivers in the case of a pair of carding machines) will be supplied to the draw frame.

As a result, the integration of a previously autonomously operating draw frame in a machine which also previously operated autonomously, such as a carding or combing machine, is hereby proposed. In a further variant such as in the application of a combing machine, a further drafting arrangement in the form of a subassembly of a draw frame for doubling and drafting several slivers is interposed between a first drafting arrangement assigned to the machine and the coiler, although the combing machine including the drafting arrangement assigned to the same will only supply one sliver in this case. The operating devices of the two mutually cooperating machines are preferably adjusted to one another in order to eliminate any avoidable detours by the operating personnel. This may require an adjustment of the direction of flow of the one or other machine.

The drafting arrangement assigned to the subsassembly can be provided with the usual infrastructure of the draw frame such as the frame and the drive and operating devices. The creel of the conventional draw frame can be replaced by a transfer device which forwards the sliver material supplied by the machine that processes the textile material to the further drafting arrangement.

A modern drive system for a textile machine is based on the frequency converter technology (see for example "Drehstrommotoren mit Frequenzumrichtern für Textilmaschinen"—"Rotary current motors with frequency converters for textile machines" (Textil Praxis International 1992, January, pages 37,38)). Such a drive is shown for example for a carding machine in DD-A-224626. Several converters (single converters) are used in this case. It was proven according to EP-A-671 355 that such drive systems can be extended in order to include the coiler too, although wrong drafts can be produced particularly easily in the sliver path between the machine and the coiler.

According to an embodiment of the present invention the drafting arrangement is provided in the first variant with a predetermined (optionally adjustable) draft, with both the drive for the textile machine as well as the drive for the drafting arrangement comprising at least one frequency-controlled rotary current motor. A common frequency converter or a pair of frequency converters is provided for supplying said motors, with the converters of one pair being mutually coupled in order to provide the same output frequency or output frequencies at a predeterminable ratio. The rotary current motors can preferably be asynchronous motors, i.e. motors which due to slip are provided with load-dependent speed characteristic at constant feed frequency. Such a characteristic (despite the risk of a wrong draft) can be used because it has been seen that the expected changes in load during operation have such similar behaviour at the relevant places that the difference of the relative speed faults (i.e. the difference in speed as compared with the synchronous speeds) remain within very narrow limits (acceptable tolerances) in practical operation.

It is therefore accordingly possible to provide a drive system for a textile machine which produces and further process slivers, where both the sliver-supplying elements as well as the processing elements are driven by motors which are provided with a load-dependent speed characteristic. The drive system preferably comprises a motor control unit which is designed in such a way that any slip of the motor that occurs in operation remains within predeterminable limits. The control unit preferably comprises a controllable power unit which supplies the said motors. The power unit is preferably controllable concerning the frequency of the thus supplied electric power. Is comprises for example at least one frequency converter and the aforementioned motors are then preferably motors which can be controlled by way of the feed frequency. For cost reasons, rotary current asynchronous motors (such as squirrel-cage induction motors) will usually be chosen, with the use of other motors which are controllable by way of the frequency (such as reluctance or even synchronous motors) not being excluded. The preferred type of motor is the so-called geared motor. The effective speed of such a motor is influenced both by the feed frequency as well as the multiplication or gear reduction of the gear associated with the motor. The gear can comprise change points, so that the effective speed at a given feed frequency can be set. The overall system is preferably arranged in such a way, however, that no change points are required.

The drive for the drafting arrangement can comprise several motors. It is also possible to provide only one single motor in the drive of the drafting arrangement, which then requires a mechanical transmission of the motor output to different elements of the drafting arrangement.

The invention provides a respective apparatus, with a drafting arrangement for application between the sliver-forming device and the coiler of a textile machine, with the coiler being formed by a subassembly of a draw frame for doubling and drafting slivers, with the subassembly also comprising the drafting arrangement of the draw frame.

It is further proposed that the subassembly comprises a drafting arrangement with a delivery speed in excess of 400 m per minute.

It is preferably proposed that the drafting arrangement of the subassembly is arranged as an evening unit, meaning that the drafting arrangement is provided with a regulating or control device in order to ensure the formation of an even sliver.

The feed table of the draw frame can be equipped with a sliver guide element for a single sliver.

Current carding machines show delivery speeds of between 10 m per min. and 300 m per min. The sliver titre is usually in a range of 3.5 to 6.5 ktex. The drive motors of the sliver-supplying elements for the carding machine (the outlet) show speeds of between 150 and 4,500 rpm at feed frequencies of between 5 and 150 Hertz. The required output of a frequency converter is in the range of 1.5 to 3 kW to supply the card outlet as well as the drafting arrangement with power.

The invention also deals with the improvement of the degree of fibre alignment and the reduction of the number of fibre hooks in the card sliver. The term "card sliver" shall mean a sliver which is supplied to a coiler downstream of the carding machine.

State of the art:

The meaning of the degree of fibre alignment and the problems arising from the formation of fibre hooks in the card have been explained in the technical publication "Vekürzte Baumwollspinnerei; Faserband-Spinnverfahren" [Shortened System of Cotton Spinning] (Published by "Zeitschrift für die gesamte Textillindustrie", 1965) by Prof. Dr. W. Wegener and Dr. H. Peuker (page 82 ff; see in particular pages 87 through 97). It shows that the use of a drafting arrangement to improve the degree of fibre alignment is the card sliver is known (page 87/88: Chapter "Karden-band-Verzugsaggregate" [Card Sliver Drafting Units]; also see page 72—"Graf-Optima Karddenband-Vergleichmässigungsaggregat" [Graf-Optima Card Sliver Evening Unit]). In the meantime, further proposals have been made for the use of a drafting arrangement at the outlet of the carding machine (see for example U.S. Pat. Nos. 4,100,649; 3,703,023; Textile Asia, June 1989, page 20; CH-C-462 682; U.S. Pat. Nos. 4,768,262; 5,152,033; 4,947,947; 5,400,476; 5,274,883; 5,018,248; DE-A-22 30 069; EP-A-512 683).

Since the publication of the aforementioned technical publication, interest in the direct spinning of card sliver (without interposed passages of drawing) has even increased, because such a method benefited from the success of rotor spinning (from 1970), cf. DE-A-40 41 719. Nevertheless, it has not yet been managed to realize the direct spinning of card sliver (without a passage of drawing) by means of the rotor spinning method.

In other words, it is known to date to deposit the card sliver (in a can), to draw off and draft the sliver at least once (from the can) in order to increase the degree of alignment, whereupon the fibres (following further optional processing steps) can be spun. In such drafting no efforts are made towards an improvement of the supplied material. Six (or eight) slivers are joined into a nonwoven which is thereupon subjected to a six-fold (or eight-fold) draft. The invention provides a method for the formation of a card sliver according to which a card web is joined into a sliver, the sliver is drafted and the drafted sliver is deposited, characterised in that the sliver is subjected to such a high draft during the drafting by means of a drafting arrangement for the doubling of slivers that the degree of fibre alignment is increased substantially and that the share of hook fibres is reduced substantially. In particular, the drafting of the sliver which occurs prior to the depositing (e.g. by means of the aforementioned drafting arrangement) can be used to substantially reduce the share of entraining hooks (cf. the technical publication "Verkürzte Spinnerei" [Shortened System of Cotton Spinning], page 90).

For this purpose it is necessary to subject the sliver to a draft of more than 2 and preferably more than 3. If possible, a draft of 5 to 6 should be used, which can be realised only very rarely however between the card outlet and the downstream coiler without any disturbances in the running behaviour of the sliver.

In order to enable such a high draft between the sliver-forming device and the coiler, the sliver-forming device should preferably produce a sliver with a relatively low fineness (high strength), e.g. not less then 8 ktex and preferably 10 ktex or even more (e.g. 12 ktex). In order to enable this, a relatively high working width of the carding machine is used, e.g. larger than 1,200 mm. This can be realized with a machine according to CH patent application No. 1318/97 of Jun. 3, 1997. The entire content of said CH application shall hereby be incorporated herein and thus form an integral part of the present description.

Alternatives which do not require wide carding machines have been described in EP-A-627 509 and U.S. Pat. No. 5,535,488.

The sliver fineness after a drafting arrangement can be 3 to 5 ktex for example. The delivery speed at the outlet of the drafting arrangement is usually more than 400 m per min. Preferably, such a drafting arrangement is provided on top of the coiler (cf. the technical publication "Verkürzte Baumwollspinnerei [Shortened System of Cotton Spinning], page 72 and the CS patent 98 939 as mentioned therein), so that the sliver supplied by the drafting arrangement can be deposited as quickly as possible (without having to undergo any long transport paths).

The invention accordingly provides a method according to which a card sliver is joined into a sliver and the sliver is drawn with a draft of not less than 2 and preferably more than 3 prior to depositing, with the drafting being performed by a drafting arrangement for the doubling of slivers.

In other words, the invention provides a carding machine with a sliver-forming device, a coiler and a drafting arrangement interposed between the sliver-forming device and the coiler, with the drafting arrangement being arranged for producing a draft of more than 2 and preferably more than 3 and being suitable for the doubling of slivers.

The drafting arrangement can be formed as an evening unit, meaning that it can be arranged to produce a controllable variable draft, which is not relevant for the invention however. Changes in draft will lead to respective changes in the degree of alignment. The carding machine per se can therefore appropriately be arranged as an evening unit (according to EP-A-271 115 for example), with the drafting arrangement to be connected being designed so as to increase the degree of fibre alignment.

The present invention can be realized in a carding machine for example which is realized according to DE patent application no. 197 38 053 of Sep. 1, 1997.

The invention can also be used for the production of a combed sliver in a combing machine, according to which a combed nonwoven is joined into a sliver. The slivers formed at each combing head are joined or twisted by means of a drafting arrangement into a sliver. The sliver thus formed is thereafter drafted again and deposited. The drafting of the sliver which occurs prior to the depositing can be used in particular to reduce the effects of the piecing (irregularities in the fibre mass) of the combing method.

The sliver fineness after the further drafting arrangement can be 3 to 5 ktex for example. The delivery speed at the output of the last drafting arrangement is more than 400 m per min. for example. Preferably, such a drafting arrangement is provided on top of the coiler (cf. the technical publication "Verkürzte Baumwollspinnerei [Shortened System of Cotton Spinning], page 72 and the CS patent 98 939 as mentioned therein), so that the sliver supplied by the drafting arrangement can be deposited as quickly as possible (without having to undergo any long transport paths).

The last drafting arrangement can be formed as an evening unit, meaning that it can be arranged to produce a controllable variable draft. The combing machine per se, including a first drafting arrangement associated with the same, can appropriately also be arranged as an evening unit (e.g. according to EP-A-376 002).

Examples of the invention are now explained in closer detail by reference to the embodiments as shown in the figures of the drawings by way of application in a carding or combing machine, wherein:

BRIEF DESCRIPTION OF THE DRAWINGS

FIG. 5A shows an extended embodiment according to FIG. 5 with an electric choke member;

FIG. 5B shows a further embodiment according to FIG. 5A;

DETAILED DESCRIPTION

Figure 1:
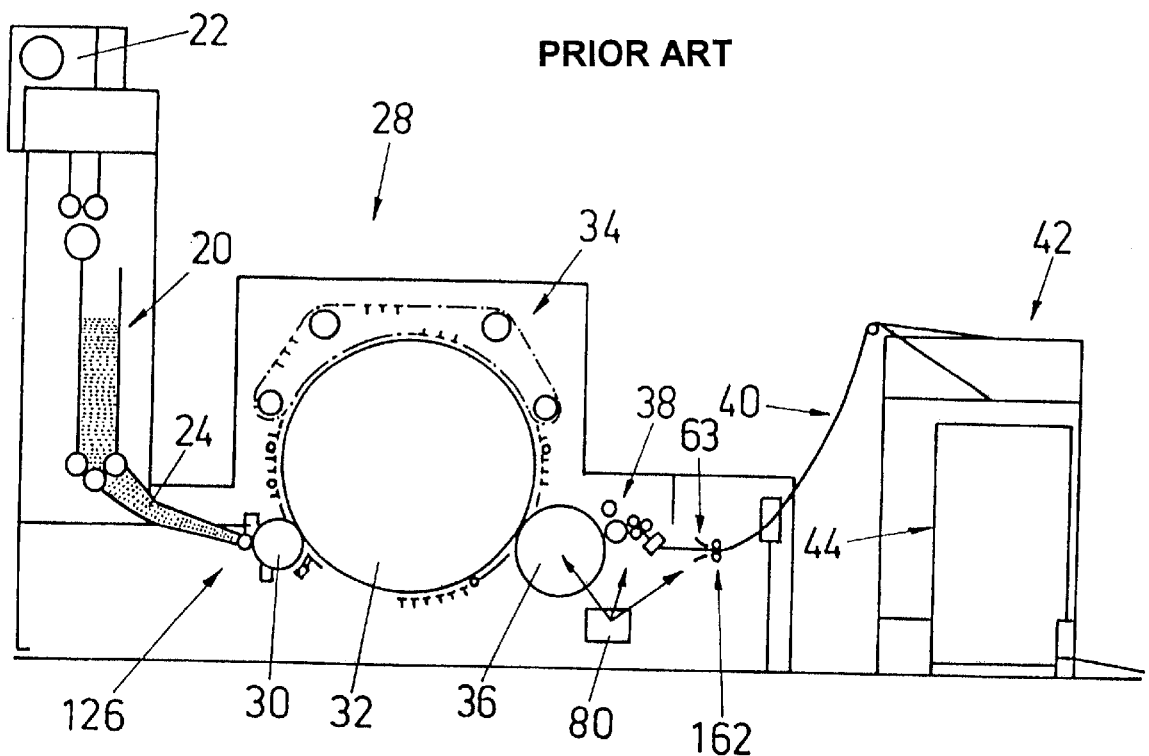
FIG. 1 shows a copy of FIG. 1 of EP-A-671 355.

The carding unit as represented in FIG. 1 comprises a filling box 20 receiving fibre material from a schematically shown flock conveying system 22 and forms therefrom a lap 24 which is forwarded to the feed apparatus 126 of card 28. The card per se is of conventional design with a licker-in (which is also known as a taker-in) 30, a cylinder (which is also known as a swift) 32, a revolving flat device 34 and a doffing cylinder 36 which forms a part of the outlet 38. A sliver 40 is formed in the card outlet which is supplied to the coiler (can press or can coiler) 42 where the sliver is deposited in windings in a can 44. The coiler 42 is an autonomous machine with its own drive and can be placed freely with respect to the carding machine 28. It comprises a frame 66 (FIG. 2) with a head part 68, a base section 70 and an interposed can receiving station (no reference number). The most relevant working elements of the coiler comprise the following:

- a turntable in the base section 70,
- a funnel wheel in the head part 68, and
- a pair of draw-in rollers above (or below) the funnel wheel.

Can 44 is placed on the turntable and fastened against rotation towards the turntable (not shown). The turntable is rotated by the coiler drive about a vertical axis, with can 44 being entrained thereby.

Figure 3:
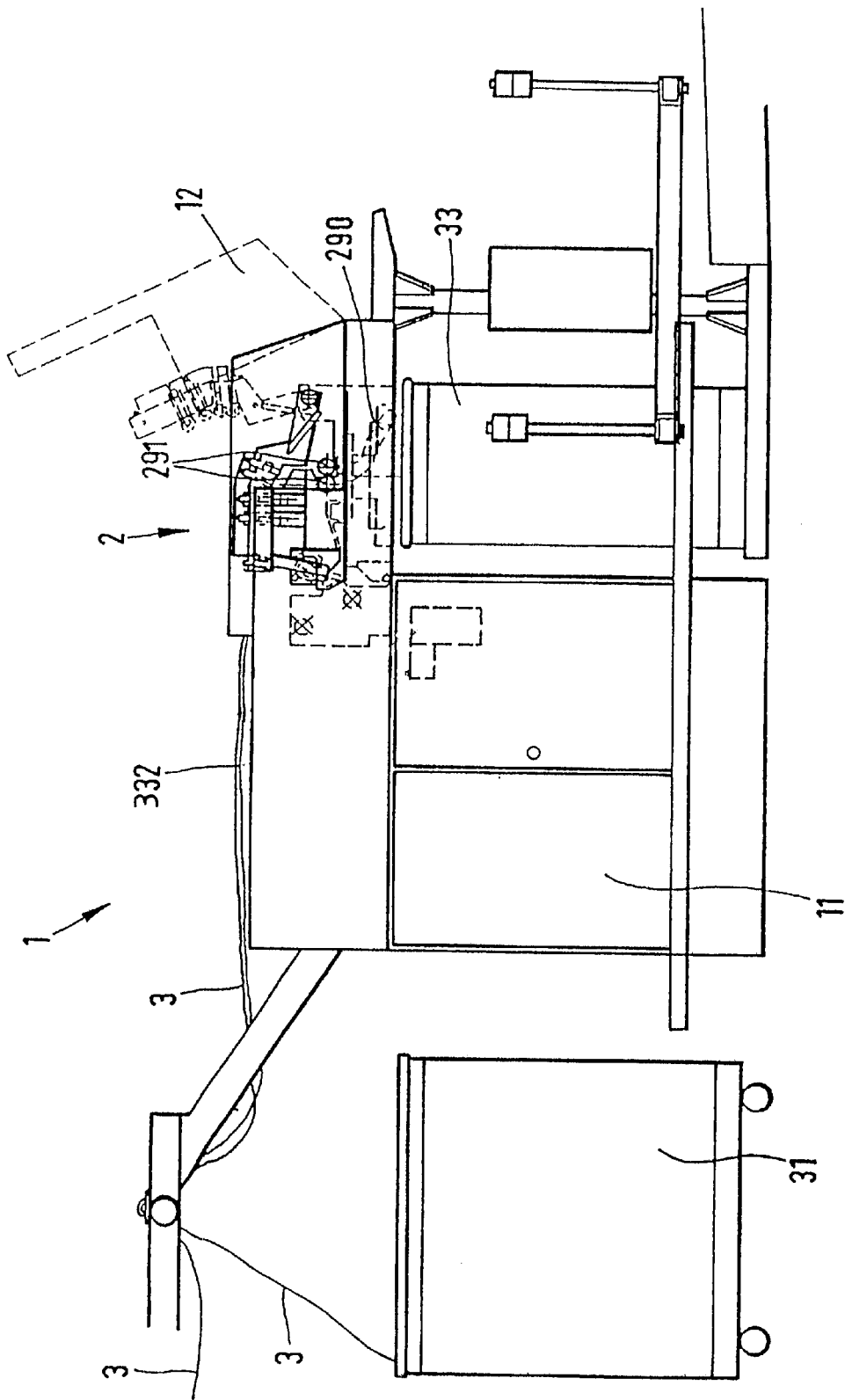
FIG. 3 shows a copy of FIG. 1 of DE-A-195 48 840.

Draw frame 1 in FIG. 3 consists substantially of a housing 11 for receiving the drive and auxiliary units as well as the drafting arrangement 2 for drafting and doubling the slivers 3. They are taken from feed cans 31 and supplied to drafting arrangement 2 via a feed table 332 of draw frame 1. Cans 31 are supplied by a carding machine in accordance with FIG. 1 for example (cf. can 44, FIG. 1). Once the sliver 3 has left the drafting arrangement, it is guided into a depositing pipe 290 by way of the calender rollers 291, which pipe is part of a turntable which places the sliver in a depositing can 33. The drafting arrangement is covered from the ambient space by means of a cover 12 which is shown in FIG. 3 with a broken line. Cover 12 substantially comprises a suction means which removes the dust-like material which is released during drafting. The cover can be swiveled away from the drafting arrangement, which can favorably occur in the same direction with the pressure arms. The bottom rollers of the drafting arrangement 2 are driven in the known manner by belt drives. Reference is hereby made to DE-A-195 48 840 for further details concerning the drafting arrangement.

The working elements of the draw frame are disposed at such a height that they cannot be reached by the operator without additional auxiliary means. A platform is therefore provided on the housing 11 on which a person can stand/walk in order to obtain access to table 332, cover 12 and drafting arrangement 2. Such a platform is usually only provided on one side of the machine, because bulky devices (drive elements) are provided on the other side. In the exhibited machine the material flow runs from left to right as seen from the operator's side.

The feed cans 31 are placed in a "bank creel", with only one can being shown in FIG. 3 for reasons of limited space. Usually, at least four and preferably eight slivers are taken from a can each and joined on the table 332 into a nonwoven. This step is shown in DE-A-41 42 038 for example. The draw frame 1 is accordingly designed for "doubling" (joining) several slivers 3, with the drafting arrangement 2 being designed for the drafting of a nonwoven formed of several slivers. The drafting arrangement 2 is provided with such a draft, however, that the sliver supplied by the same shows the same average fineness (count) as the incoming slivers 23, meaning that the drafting arrangement usually produces a basic draft of 6 or 8.

The overall draft of drafting arrangement 2 can be predetermined fixedly (but preferably adjustably), as is the case for example in the SB draw frame of Rieter Ingolstadt. In a variant the drafting arrangement 2 can be formed as a controlled drafting arrangement as is the case in the Rieter Ingolstadt RSB draw frame.

Figure 4:
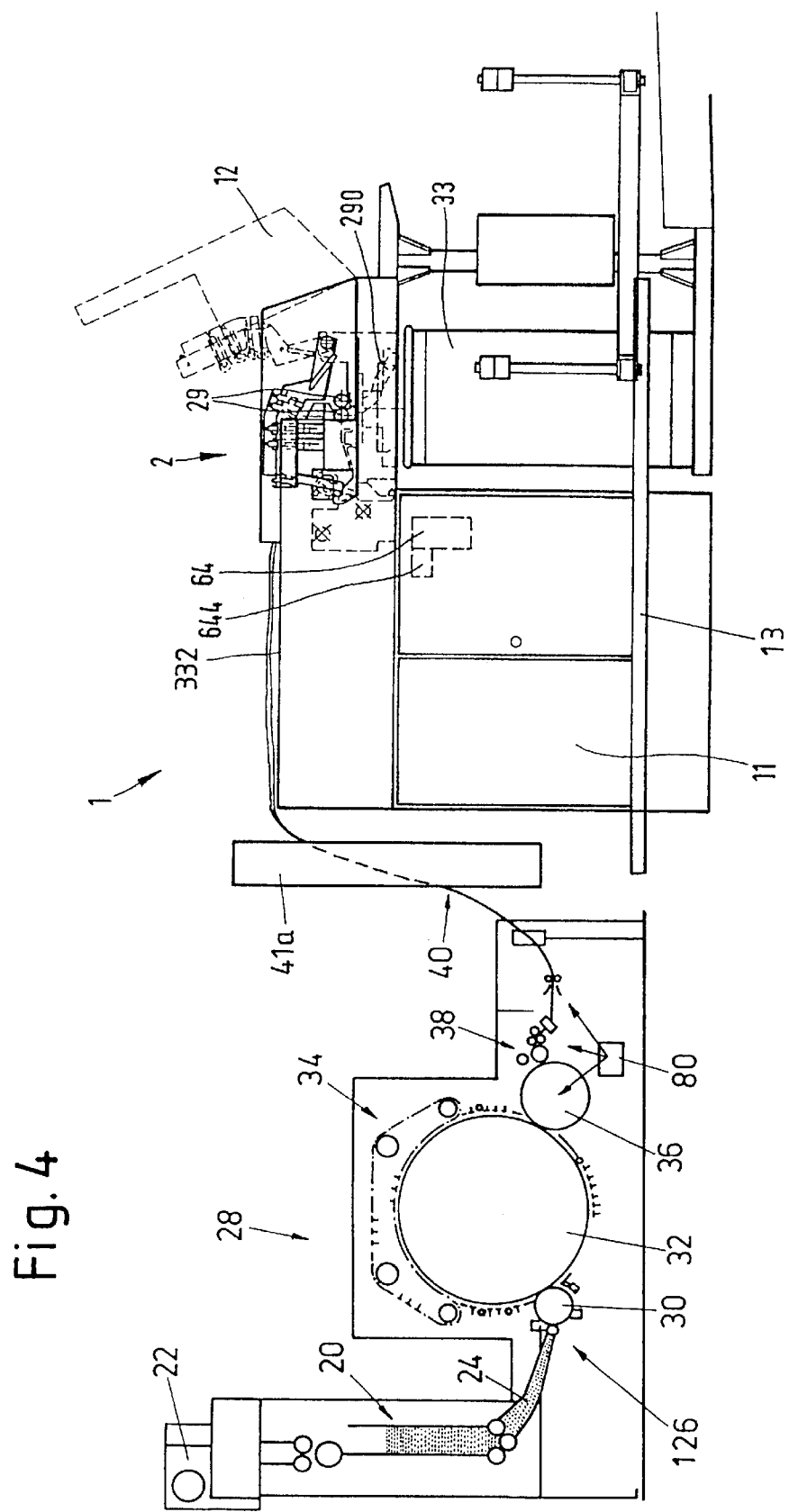
FIG. 4 shows a schematic representation of a combination according to the present invention.

FIG. 4 now schematically shows a new combination of the machines according to FIGS. 1 and 3. The various scales of the illustrations contained in said schematic figure were disregarded. In this combination the coiler 42 of the card according to FIG. 1 and the can creel of the draw frame according to FIG. 3 have been eliminated. Instead of said creel, a transfer device (indicated schematically with reference number 41a) has been interposed.

Carding machine 28 in FIG. 4 still supplies a single sliver 40 which is now forwarded via feed table 332 to the drafting arrangement 2 within needing to be deposited first in a can. The drafting arrangement 2 remains unchanged (in comparison with drafting arrangement 2 in FIG. 3), which means that this drafting arrangement is still suitable to draft a nonwoven, with only a single card sliver being supplied in this case. The infrastructural devices (e.g. the drives and the suction devices) of draw frame 1 according to FIG. 3 can also remain unchanged. This allows adding freely available drafting arrangement modules to a carding machine without having to design and construct a drafting arrangement specially designed for the carding machine. The draw frame/coiler unit is substantially autonomous with respect to the carding machine, particularly concerning the positioning of the coiler with respect to any automated can conveying system (not shown).

The feed table 332 should now be provided with at least one sliver guide element (not shown) which is capable of introducing a single sliver via the long table into the draw-in rollers of the drafting arrangement 2. The table can also be provided with threading aid (not shown) in order to facilitate the threading of a single sliver.

A draw frame can usually be brought to a standstill during the exchange of cans in its coiler since the run-up and run-down of the rollers of a draw frame's drafting arrangement is usually easy to manage. A carding machine cannot be brought to a standstill during a can exchange in a coiler directly associated to the same (e.g. in coiler 42, FIG. 1), since the rollers of a carding machine have a relatively high inertia of mass. The coiler of a carding machine must therefore be designed to perform a "change on the fly". The coiler of the draw frame 1 in FIG. 4 is preferably arranged in a pertinent manner so as to enable a flying change. A suitable sliver severing apparatus has been shown in EP patent application no. 97810729, whereby it is presumed that this application will be published on Jun. 10, 1998 under the no. EP-A-846 795.

FIG. 4 shows a spanning can with a circular cross section in the coiler. The machine combination in accordance with FIG. 4 is particularly important for the so-called direct system of spinning, according to which the sliver supplied by the drafting arrangement is further supplied to an end spinning machine. The end spinning machine should be designed for spinning sliver with a predetermined count, as is the case for the rotor spinning machine for example. Particularly for the rotor spinning it is often appropriate to replace round spinning cans by so-called "flat top cans". Devices suitable for this purpose are disclosed for example in DE-A-42 33 357, DE-A-43 24 951, DE-A-43 24 948, DE-A-44 16 911 and DE-A-44 16 948. The coiler according to FIG. 4 can be replaced in such cases by a coiler for flat top cans, with such modifications not playing any role however for the coupling of the draw frame assembly with the carding machine.

An embodiment of a drive for the carding machine per se has been described in the German utility application G 9312638.7 of Aug. 24, 1993. The drive comprises a main drive motor (not shown) for the swift 32 (FIG. 1) and the revolving flat device 34. The main drive motor can be designed according to EP-A-557 242 for example. In addition, a drive motor 80 for the doffing cylinder 36 and the other working elements of the outlet 38 up to and with a pair of rollers 162, as is schematically indicated in FIG. 1 by the arrows commencing from drive 80. The pair of rollers 162 can be arranged according to EP-A-186 741 for example in order to produce a signal dependent on the sliver count. A drive according to EP-A-450 043 can be assumed concerning the drive for draw frame 1, and for drafting arrangement 2 in particular.

Figure 5:
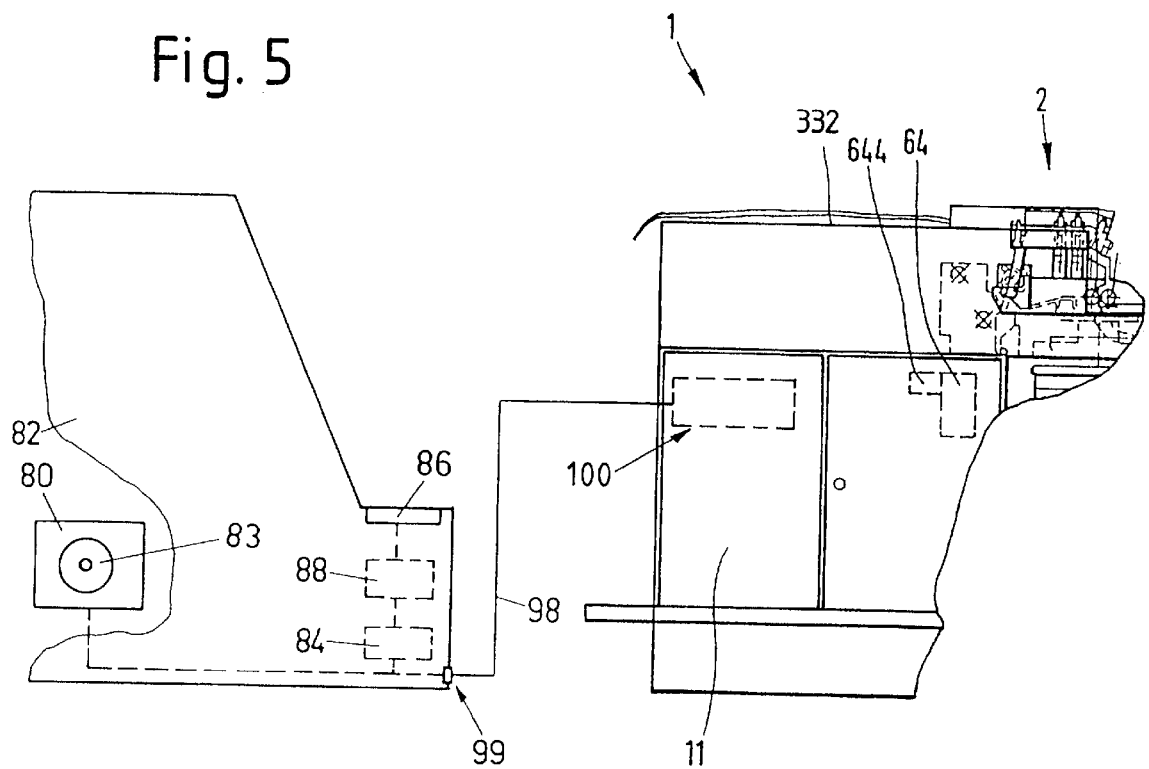
FIG. 5 shows a schematic representation of a modification.

FIG. 5 schematically shows a variant, with the reference numeral 82 indicating the casing of the outlet section of the carding machine and reference numeral 80 indicating the drive for the outlet again. In a cost-effective embodiment, said drive 80 comprises a continuously controllable, maintenance-free asynchronous motor 83 (e.g. squirrel-cage induction motor) which is supplied with electric power by means of a frequency converter 84. The output frequency of the converter 84 can be adjusted via an input device 86 which is integrated in a programmable control unit 88 of the carding machine. Such an arrangement is currently general state of the art for the carding machine, which means that the elements 80, 83, 84, 86 and 88 (or their respective equivalents) are virtually mandatory for a modern carding machine.

Figure 6:
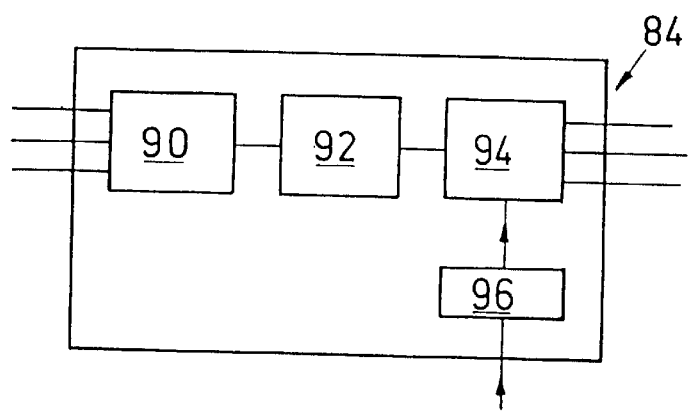
FIG. 6 shows a detail of FIG. 5.

The converter 84 usually comprises a rectifier 90 (FIG. 6) which supplies alternating current from a three-phase mains and supplies direct current to an intermediate circuit 92. A controllable power unit 94 converts the direct current from the intermediate circuit 92 into alternating current with a frequency which is determined by a converter control unit on the basis of a signal from unit 88. Said alternating current (single-phase or three-phase) is supplied to the motor 83.

The synchronous speed of the motor 83 is predefined definitely by the output frequency of the frequency converter 84. The effective speed of the motor shaft is not determined by the dependence on this synchronous speed alone. This speed also depends on the load to which the motor is subjected, meaning that a so-called "slip" arises in motor 83 between the rotor and the stator. This fact alone would not lead to any problems if the slip were foreseeable. In practical operation, however, it changes continuously as a function of the momentary load conditions which are not precisely foreseeable.

Although the slip is not controllable, the "slip behaviour" (i.e. the progress of the change of the slip depending on changes in load) can be estimated both in the direction as well as in the magnitude. In the outlet section these mainly concern frictional losses and condensation work, e.g. when the sliver is pulled through the funnel 63 (FIG. 1). Such load components are dependent on sliver titre and delivery speed. Over a delivery speed range of up to 300 m per min. one can choose asynchronous motors which under these circumstances will have a slip of not more than 3%.

The frequency converter 84 will usually be designed in such a way that it is at least capable of supplying a coiler too with the required power, which is due to the fact that the carding machine is often provided with a coiler which is mechanically coupled with the same and therefore principally needs to be designed accordingly. It is therefore no problem to take the power required for an "autonomous" machine from the output of the converter via a socket 99 of the carding machine casing 82 for example and to supply the power via a cable 98 to a drive motor 100 of the draw frame 1. The motor 100 is a simple rotary current gear motor which, similar to motor 83, is controlled directly by the power obtained from the frequency converter. The draft in drafting arrangement 2 is fixedly predefined, but can still be adjusted if necessary.

Changes in draft can be produced by change gear wheels in the gears. In the preferred solution there is no change gear wheel in the gear between the motor 83 and the pair of rollers 162, as otherwise it would be necessary to perform a respective change of the draft-defining change gear wheels of motor 100 in the case of any change of the speed or speed reduction ratios at this place when no change of draft is intended.

This variant is applicable if the requirement is fulfilled that the slip behaviour of the drive for the machine outlet is similar to the slip behaviour of the draw frame drive. This requirement can also be fulfilled when not all elements are driven by a single motor in the carding machine outlet. Usually, the outlet is only put into motion from the doffing cylinder to the delivery by a single drive source.

FIGS. 5A and 5B show further embodiments. As described in FIG. 5 in detail, the drive 80 of the outlet 38 of card 28 and drive 100 of the draw frame are supplied by a common frequency converter with electric power. The drive of the draw frame (e.g. when using an asynchronous motor) requires a very high current until is has run up to a respective speed. Occasionally it is necessary to bring the machine combination carding machine/draw frame to a stop in order to perform a change of assortment or maintenance work. It can also occur that only the draw frame is brought to a stop in order to piece at the drafting arrangement 2 a new sliver which is supplied from the outlet section of the carding machine. During the renewed start-up of the machine combination or the draw frame alone it can happen that by the sudden connection of the drive 100 of the draw frame 1 an overload of the common frequency converter 84 occurs, thus leading to a breakdown of the frequency converter and thus also interrupting the drive of outlet 38 of card 28.

In order to prevent this it is proposed to install an electric choke member 411 in the transmission line 98 in order to limit the current supply to drive 100 to a certain value which ensures that no current peaks will occur which would lead to a breakdown of the frequency converter.

During the start-up of draw frame 1, switch 406 is closed and the drive 100 is supplied via the current paths 406 and 410 as well as via the electric choke member 411. The switch 409 which is arranged parallel to the choke remains open during the entire start-up phase. Once the start-up phase has been completed and the drafting arrangement unit 2 has reached a certain speed, switch 409 can be closed, as a result of which power can now be supplied directly via line 98 by bypassing choke 411.

FIG. 5B shows a further embodiment in which an element 404 for limiting the power supply is integrated directly in the common frequency converter 84 instead of the choke member 411. This element 404 is controlled via line 405 by a control unit ST and according to the start-up phase in order to prevent any overload of the converter element 401. The converter element 401 is connected via line 403 with the element 404. The electric power to drive 80 is also taken from line 403 and conducted via line 402.

A disturbance-free run-up of the drafting arrangement unit is ensured with the devices as shown in FIGS. 5A and 5B. The application of such a device is also possible in other combinations of machines (e.g. combing machine/draw frame) as long as the coupling of their drives is performed by way of a common frequency converter.

Figure 7:
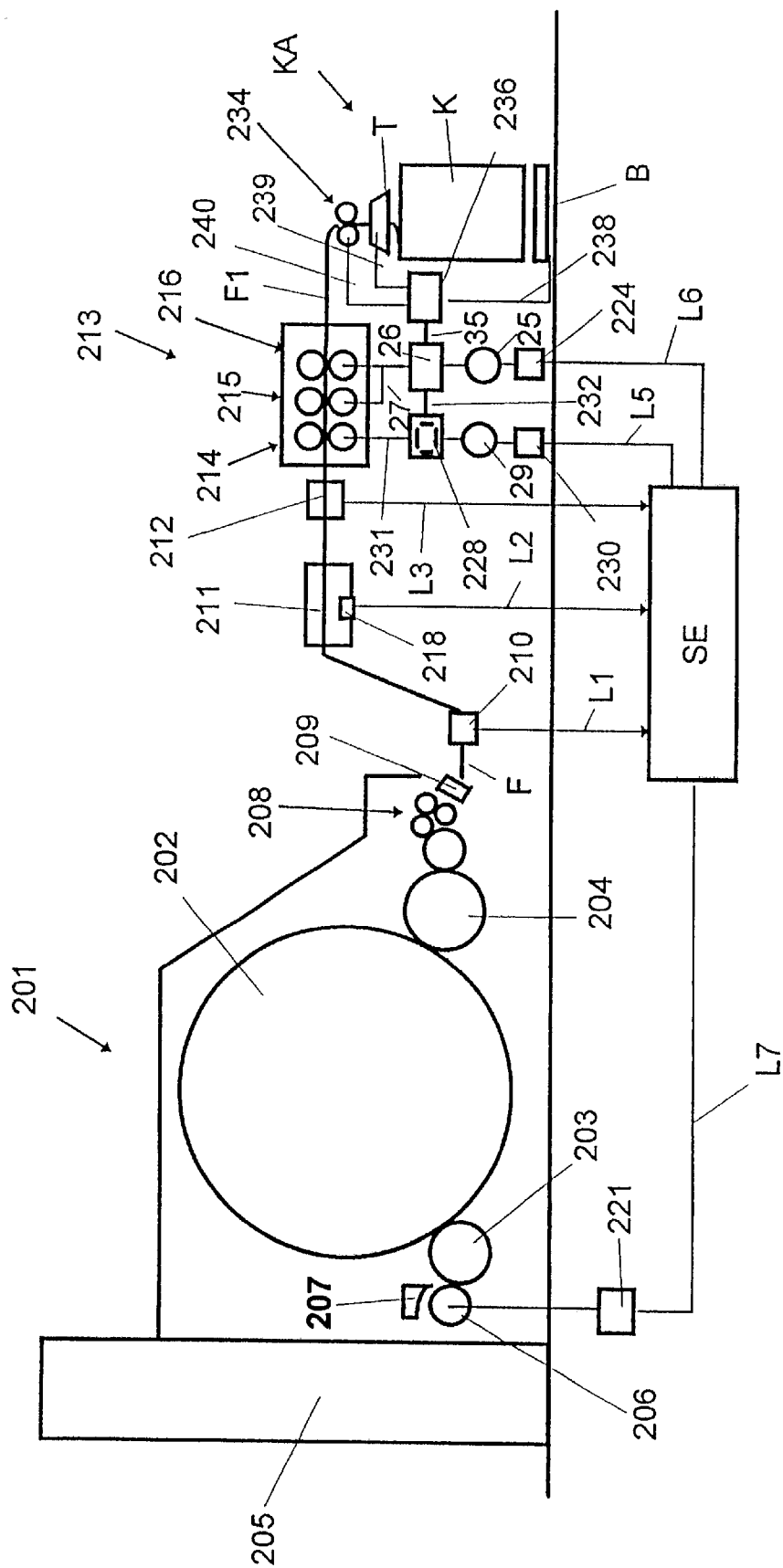
FIG. 7 shows a schematic view of a carding machine according to the invention.

FIG. 7 schematically shows a carding machine 201 which is provided with a cylinder 202. The fibre material supplied via a schematically shown filling box 205 reaches cylinder 202 via a feed roller 206 and a licker-in 203. A feeding trough 207 is arranged above the feed roller 206. The feeding trough 207 can, as is known, be arranged movably and is used simultaneously as a sensor to detect any unevenness in the material concerning the supplied quantity of material. The supply of the material batch can be controlled by the filling box on the basis of this signal. A doffing cylinder 204 is used to take up the fibres dissolved by drum 202, which material is then supplied to the downstream conveying rollers 208 for the nonwoven.

The nonwoven conveyed and advanced by conveying rollers 208 is supplied to a cross conveyor 209 for example. A sliver F is formed by the lateral conveyance or lateral drawing off of the nonwoven by way of the cross conveyor 209. Deflection aids or funnel elements (not shown) are used to form said sliver F which needs to be deflected at the end of the cross conveyor 209. Sliver F, which is also known as card sliver, is thereafter guided through a sensor 210 which determines the sliver mass (actual value) and sends this information via a line L1 to a control unit SE. The sensor 210 is substantially used to detect long-wave changes or to detect deviations of the sliver mass from a predetermined setpoint value. On the basis of the actual value signal as emitted by the sensor and in comparison with the setpoint value as stored in the control unit SE a control impulse will be produced if necessary, which impulse is transmitted via line L7 to drive 221 of the feed roller 206 for control purposes. As a result of this readjustment of the drive 221 or the change in the speed of the feed roller 206 it is possible to compensate the deviations in mass as determined by sensor 210 in a time-delayed manner.

The sliver F passing through sensor 210 reaches a sliver storage means 211 which is shown schematically and acts as a buffer sector for the sliver to compensate differences in the conveying speed of the sliver between the output of the card and a downstream autoleveller 213. The sliver storage means 211 is provided with a monitoring sensor 218 which sends a signal to the control unit SE via line L2. Before the sliver F as supplied by the storage 211 reaches the autoleveller 213 it is scanned by a sensor 212 which sends the values as determined thereby via a line L3 to the control unit SE.

The drafting arrangement 213 consists in the illustrated example of three successively connected pairs of rollers 214, 215 and 216, with the pair of input rollers 214 being driven in a speed-adjustable manner in order to compensate for any fluctuations in mass in the sliver. In a preferred variant (not shown) the compensation is performed by changes in draft in the main drafting zone (between rollers 215 and 216). The explanation on the basis of the illustrated embodiment also applies analogously to the preferred variant.

The pair of delivery rollers 216 is driven with a constant speed by way of a main motor 25 and a downstream gear 26. As is schematically indicated in the drive train 27, the middle pair of rollers 215 can also be driven at a constant speed in order to have a constant speed ratio with respect to the downstream delivery rollers 216. As a result of the predetermined speed ratio, a constant draft of the sliver is performed between the pairs of rollers 215 and 216. Motor 25 is controlled by the control unit SE by a frequency converter 224 and via line L6. A differential gear 228 is driven by the drive connection 232, which gear drives the pair of input rollers 214 by way of the drive train 231. The drive of the differential 228 can be overridden by a servo-motor 29 which is driven by the control unit SE via the frequency converter 230 and the line L5. This overriding is performed on the basis of the signals as emitted by the sensor 212 which are compared with a setpoint value stored in the control unit SE.

In FIG. 7, a can coiler KA is arranged downstream of the autoleveller 213 in which the sliver F1 supplied by the drafting arrangement is deposited in a can K via a pair of calender rollers 234 and a funnel wheel T. Can K stands in this process on a driven can turntable B which makes can K rotate during the filling process. Can turntable B is driven by a gear 236 by way of the drive path 238, the calender rollers 234 and the funnel wheel T are also driven by said gear 236 via the drive path 240 and 239. The gear 236 receives its drive via the schematically shown fixed drive connection 35 of gear 26 which is driven by the main motor 25. This shows that the pair of delivery rollers 216 are fixedly coupled with the drive elements of the can coiler KA directly by way of gear 26. This means that as soon as the gear 26 is driven by motor 25 at a lower speed, the basic speed of the pairs of rollers 214, 215 and 216 decreases, as does simultaneously the speed of the calender rollers 234 of the funnel wheel T and the can turntable B of can coiler KA.

The sliver F formed and supplied by carding machine 201 by way of the cross conveyor is detected by a sensor 210 and its mass is measured. The measured values are transmitted to the control unit SE where they are compared with a setpoint value. If the determined actual value deviates from the setpoint value, a control signal is emitted for correcting the speed via line L7 to drive 221 of the feed roller 206. At the same time, this signal is also used for the correction of the basic speed of motor 25 in order to already compensate the expected effects by the control intervention in the autoleveller 213, so that the same does not exercise any relevant influence on the degree of filling of the upstream sliver storage means 211. The signal of the filling level sensor of the sliver storage means can also be used as an additional signal to adjust the basic speed. The control unit can be adjusted in such a way that the signal of the filling level sensor will only be used in addition to influence the basic speed when the same is situated outside of the predetermined tolerance range. As a result, one obtains additional security concerning the function of the first sensor at the outlet of the carding machine. If the signal of the filling level sensor is continuously located outside of its predetermined tolerance range, it is necessary to check the function of the first sensor. Since the control intervention in the feed roller 206 will show its effects only relatively late and with a time delay, the deviation of the mass from the setpoint value as determined by sensor 210 must be compensated for fully by the downstream autoleveller 213.

In this embodiment the sliver storage means 211 forms a transfer apparatus 41 according to FIG. 4.

Figure 8:
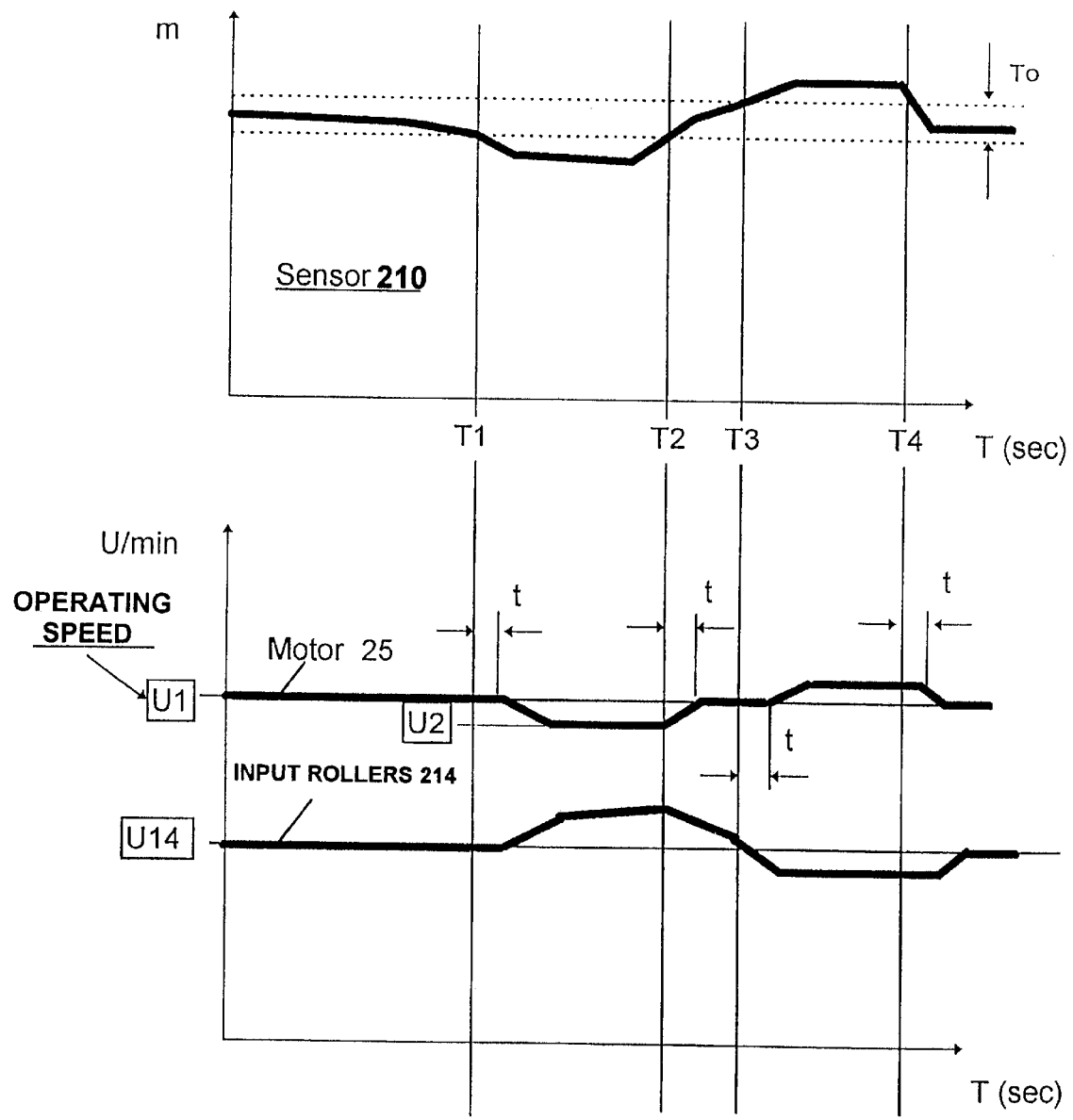
FIG. 8 shows a diagram to explain the embodiment according to FIG. 7.

The compensation is now explained in closer detail on the basis of the diagrams which are shown in FIG. 8. Based on a basic or operating speed U1, a drift of the mass m outside of the predetermined tolerance range To is determined via sensor 216 at the time T1. If the drift of the mass at time T1 would occur without any intervention in the basic speed, the procedure would be as follows: As a result of the lower mass supplied to drafting arrangement 213, the draft between the pairs of rollers 214 and 215 must be reduced. This means the speed of the pair of input rollers 214 is increased via the servo-motor 29 and the differential 228, thus simultaneously reducing the draft between the pairs of rollers 214 and 215 because the speed of the pair of rollers 215 remains constant. As a result of the reduction of the speed of the pair of input rollers 214, the draw-in speed of the supplied sliver F is reduced. Since the carding machine, and the doffing cylinder respectively, are operated at constant speed, the original delivery speed of the carding machine remains the same. The difference thus produced between the delivery speed of the carding machine and the changed draw-in speed of the sliver in the drafting arrangement 213 is balanced by the sliver storage means 211. This means that any material of sliver F supplied in excess fills the sliver storage means 211 for such a time until the same ratios are present again between the delivery speed of the card and the draw-in speed in the drafting arrangement. This balance can be produced again as soon as the control intervention in feed roller 206 shows its effects in the delivery to the carding machine. If deviations in the mass occur alternatingly up and down, then this will not have any major effects on the degree of filling of sliver storage means 211. The sliver storage means 211 merely needs to have a sufficiently large receiving capacity. If the deviations in mass occur in regular or irregular intervals substantially in one direction, the existing capacity of the buffer in the sliver storage means 211 will soon reach its limit.

In order to avoid such disadvantages and to keep the required capacity of the sliver storage means to a minimum, an intervention is performed in the basic speed of the drive motor 25. Once the deviation in mass as determined by sensor 210 at time T1 for example is located outside of a predetermined tolerance range To, the speed of the motor 25 is also changed with a time delay t. The upper diagram shows that the mass becomes smaller, as a result of which it is also necessary to reduce the draft in drafting arrangement 213 by increasing the speed of the pair of input rollers 214. If, as is now shown in the lower diagram of FIG. 8, the basic speed of motor 25 is reduced to U2, the increase in speed as initiated by servo-motor 29 towards the pair of rollers 215 will be almost entirely compensated for. This is shown in particular in the representation of the lower two curves of FIG. 8, where the lower curve shows the change in speed of the pair of input rollers 214 with respect to a speed of the pair of input rollers 215 that remains the same. This shows that the reduction in mass of the supplied sliver as detected by sensor 210 at the time T1 leads to an increase of the speed U14 of roller 214 towards the pair of rollers 215 in order to compensate for this thin place by reducing the draft. If the signal of the filling level sensor 218 is still within a predetermined tolerance range, no additional control signal will be produced for further influencing the basic speed. As a result of the simultaneous reduction of the basic speed U1 of motor 25, this change in speed of roller 214 is almost entirely compensated for, which means that the entire speed level of the drafting arrangement 213 is reduced evenly by the drive connection, so that despite the change of the speed ratios between the pairs of rollers 214 and 215 the current speed of the pair of input rollers is located at the same level as prevailed prior to the control intervention. This ensures that the draw-in speed of the sliver F remains approximately at the same level even after a performed control intervention and the change of the speed ratio. This ensures that the sliver storage means 211 merely needs to compensate short-wave control interventions. The long-wave deviations are compensated by changing the basic speed of motor 25. Sensor 218 is merely used as an additional monitoring aid. For reasons of clarity of the illustration the representation of the peaks which are caused by the short-wave compensations have been omitted in the curve of roller 214. These short-wave compensations usually fluctuate upwardly and downwardly about the illustrated curve.

The reduction of the basic speed also leads to a synchronous reduction of the speed of the drive elements of the can coiler, thus maintaining the speed ratio between the delivery roller 216 and the calender rollers 234. This compensation of the long-term drifts of the sliver mass can be performed relatively smoothly and slowly, so that the follow-up control of the relatively sluggish elements of the can coiler KA will not cause any problems.

With the proposed device it is possible with already known sensor devices to react in due time to long-term deviations in the sliver mass and to keep the sliver storage means to a minimum which is required for the regulation at the input of the drafting arrangement.

It is now proposed in addition to produce the sliver F with a fineness (sliver count) of higher than 8 ktex, preferably between 10 and 12 ktex. For this purpose it is necessary that the carding machine in accordance with FIG. 7 is able to process and supply a sufficiently high fibre mass, which can be realized in such a way that the card is provided with a relatively large working width (e.g. larger than 1,200 mm). Such a carding machine has been supplied as model KU 12 ("Superkarde") of Schubert & Seizer (see technical publication "High Speed Carding and Continuous Card Feeding", Author: Zoltan S. Szaloki, pages 72 to 75). An alternative has been mentioned in CH 2318/97 of the patentee, with the entire content thereof already having been included as an integral part of the present application.

Furthermore, the drafting arrangement 213 or drafting arrangement 2, FIG. 4, (Whether regulated or with fixedly predetermined draft) is provided with a total draft GV of more than 2 and preferably 3 to 6. The median draft in a regulated (variable) drafting zone (between the pairs of rollers 214 and 215 in FIG. 7) can be approx. 2.5; the draft in the other (fixedly set) drafting zone (between the pairs of rollers 215 and 216 in FIG. 7) can be approx. 1.2. In the variants according to FIGS. 7 and 8 the first drafting zone is designed for producing a variable draft. This, however, is not relevant. An alternative has been shown in CH 0153/97 of Jan. 23, 1997. In this case the "preliminary" draft (in the first drafting zone) can be approx. 1.1 to 1.5 (preferably 1.2) and the "main draft" (in the second, variable drafting zone) can be approx. 2.0 to 4 (preferably 2.5). The sliver thickness at the outlet of the drafting arrangement is preferably 3 to 5 ktex, e.g. 3.5 ktex. The drafting arrangement is preferably arranged directly above the funnel wheel of a coiler, as is shown in DE-Gbm-296 22 923 for example. The sliver deposited in the can can then be supplied directly to the open-end spinning machine, e.g. in accordance with EP-A-627 509.

Figure 9:
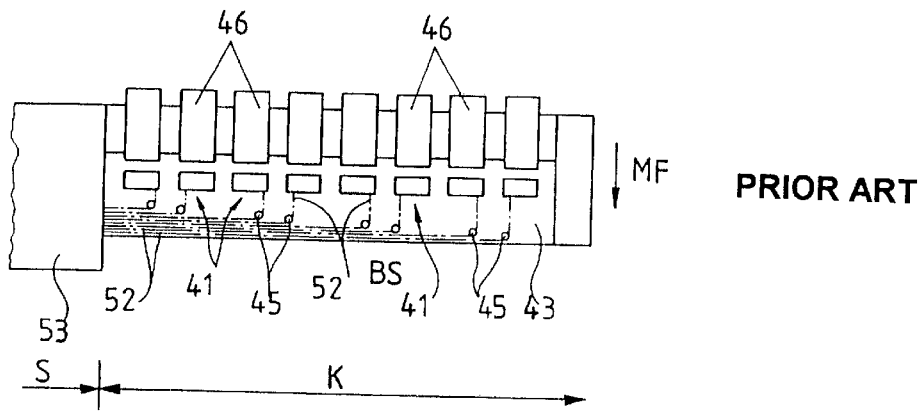
FIG. 9 shows an arrangement according to FIG. 1 of EP-A-349 866.
Figure 10:
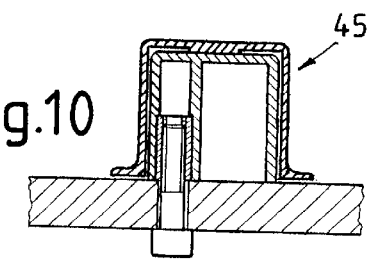
FIG. 10 shows a detail of the arrangement according to FIG. 9.

FIG. 9 schematically shows in a face view a combing machine with a number of combing heads 41 which each supply a combed sliver 52 to a common delivery table 43. A respective feed in the form of a so-called wound lap 46 is present for each combing head 41. The lap (not shown in further detail) is taken from the respective wound lap (by unwinding the wound lap), combed in the respective combing head 41 and supplied as a combed sliver 52 from the combing head, with the flow of material occurring in the direction of arrow MF. A respective sliver guide 45 is arranged on the delivery table 43 for each combing head, which guide deflects the respective combed sliver 52 into the longitudinal direction of the delivery table. The deflected combed slivers 52 then jointly run to a drafting arrangement which is housed in a housing part 53, as will be explained below in closer detail by reference to FIG. 6. One of the sliver guides 45 is shown in FIG. 10 on an enlarged scale. For further applicable details reference is hereby made to EP-A-349 866. The machine can be regarded as a combination of two units (or "subassemblies"), namely a combing unit K and a drafting unit S. The latter unit comprises a coiler.

Figure 14:
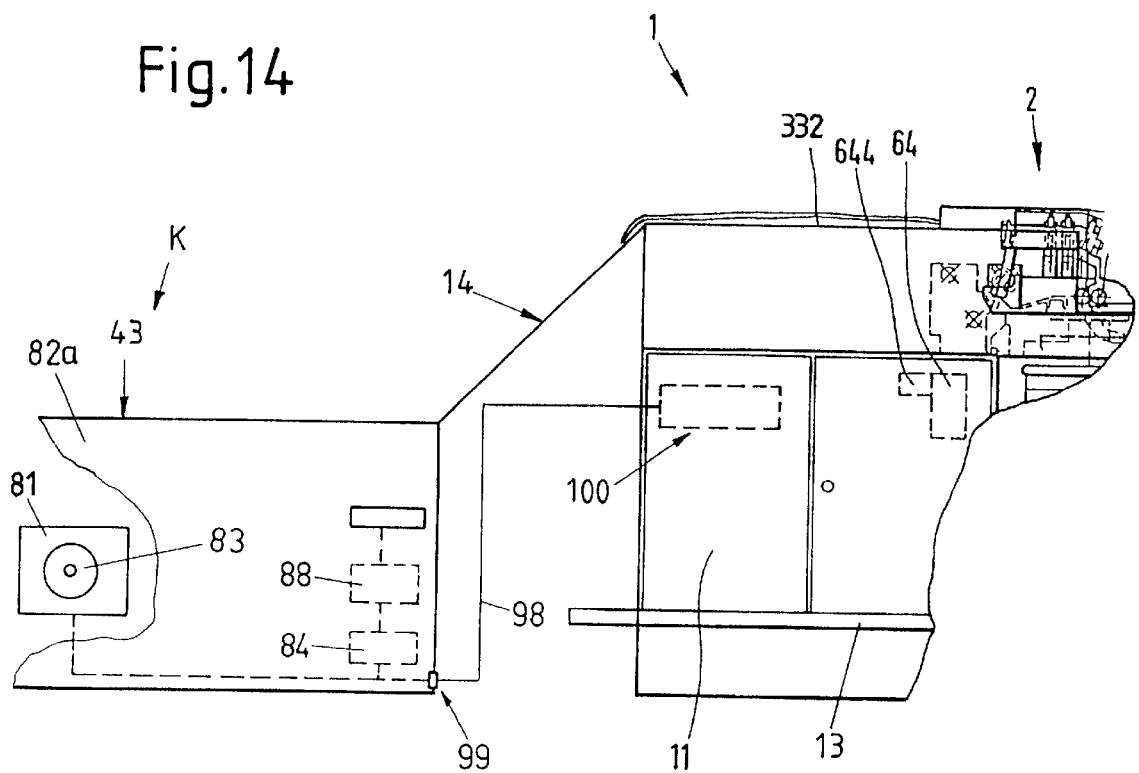
FIG. 14 shows a schematic representation of a modification of the arrangement according to FIG. 13.

A machine according to FIG. 9 is operated conventionally from the longitudinal side BS, which means that if a problem needs to remedied the operating staff is given access to a combing head 41 for example from the side BS. The wound laps 46 used for feeding are inserted or replaced from the other side of the machine. FIG. 14 therefore shows that the combed slivers 52 enter the drafting arrangement from the right to the left when the machine is viewed from the operating side BS.

Figure 11:
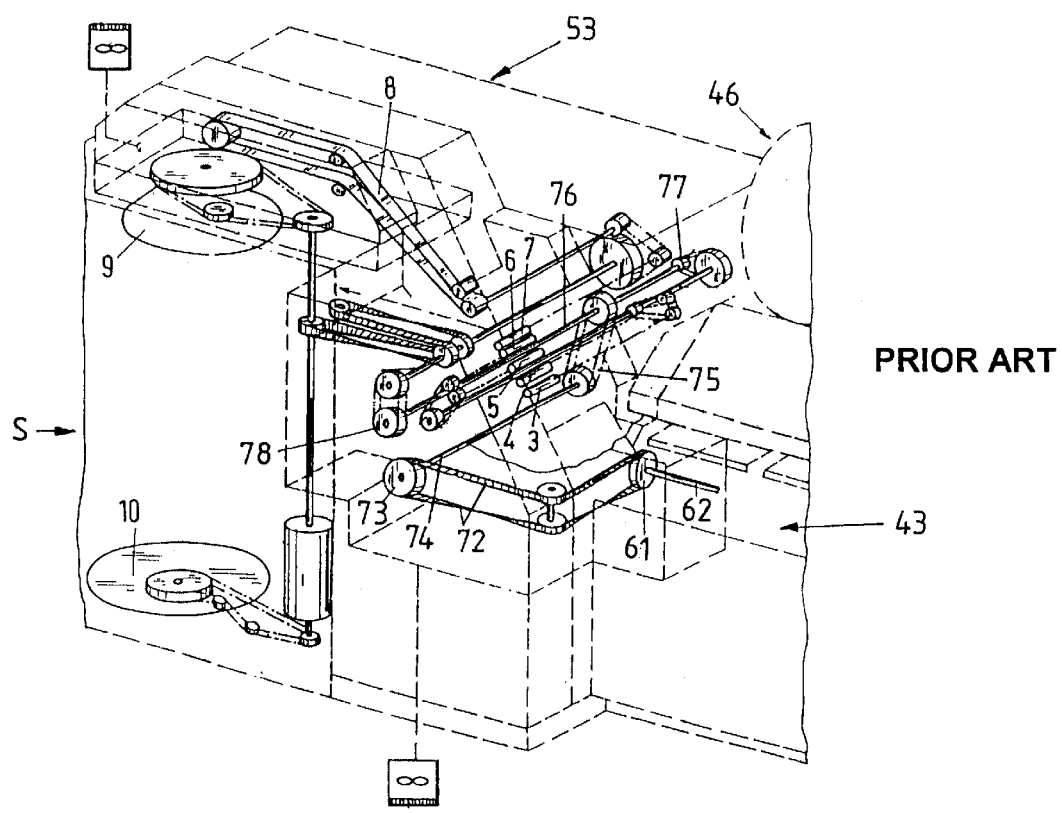
FIG. 11 shows an arrangement according to the individual FIG. of EP-A-640 704.

FIG. 11 shows a drive for the aforementioned drafting arrangement of the combing machine, with the housing of the machine being indicated with the broken lines and a part of the "last" wound lap 46 (close to housing 53) being shown. The drive shaft of the combing heads 41 (covered in FIG. 11) is indicated with the reference numeral 62.

The slivers 52 of combed fibre material supplied by the combing heads 41 are jointly supplied to a drafting arrangement, of which merely five bottom rollers 3,4,5,6 and 7 are shown. These rollers cooperate with three pressure rollers (not shown). The rollers 3,4,5,6,7 are arranged so as to extend horizontally and rectangularly to the longitudinal direction of the row of combing heads 41.

The nonwoven supplied by drafting arrangement 3,4,5,6,7 is conveyed in the form of a sliver on a conveyor belt 8 to a funnel wheel 9 which is rotatable about a vertical axis. The funnel wheel 8 places the sliver in a can (not shown) which during operation stands on a can turntable 10 which is also rotatable about a vertical axis.

A toothed wheel 61 is situated on the drive shaft 62 which is associated with the combing heads 41, which toothed wheel is coupled with a toothed wheel 73 via a first right-angle gear drive with a first crossed toothed belt 72 placed on two deflection rollers, which toothed wheel is situated on a drafting arrangement drive shaft 74 which is parallel to the drafting rollers 3,4,5,6,7. Shaft 74 drives via a further toothed belt 75 a second shaft 76 which is parallel to the drafting rollers 3,4,5,6,7 and which additionally carries two toothed wheels 77 and 78.

The toothed wheel 77 drives both the two first drafting rollers 3 and 4 as well as the third and fourth drafting rollers 5 and 6 via further transmission elements. The toothed wheel 78 on shaft 76 drives both the fifth drafting roller 7 as well as the conveyor belt 8, can turntable 10 and the funnel wheel 9 via further transmission elements.

FIG. 11 shows that the height of the coiler is higher than the height of the delivery table 43, so that the combed slivers (not shown in FIG. 11) need to "rise" in order to reach the funnel wheel 9. The drafting zones of the drafting arrangement therefore extend in an upwardly inclined way, which is why the conveyor belts 8 also need to extend in an upwardly inclined way for the time being.

Figure 12:
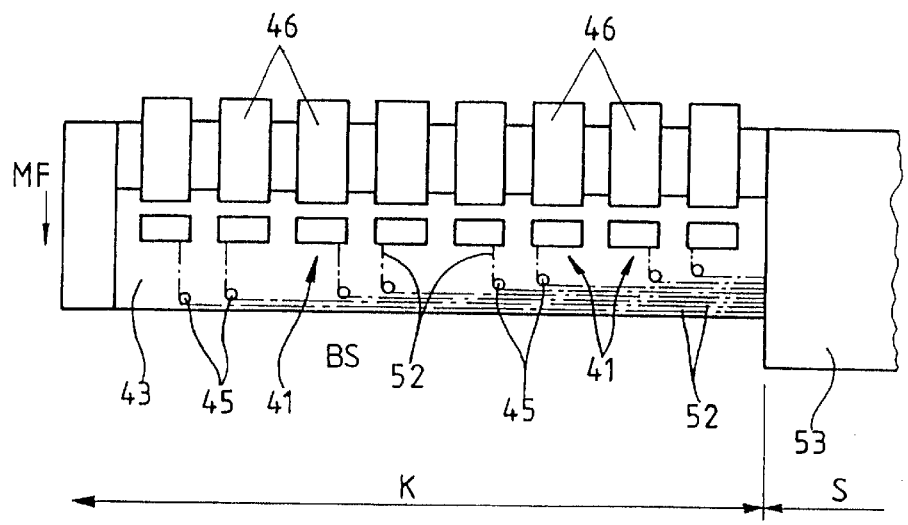
FIG. 12 shows a modification of the arrangement according to FIG. 9 in order to prepare the same for an embodiment according to FIG. 13.

FIG. 12 also shows a combing machine in a face view, with the reference numerals already used in FIG. 14 refer to the same elements in FIG. 12: The only difference between the arrangement according to FIG. 14 and the one according to FIG. 12 is that the flow of material on the table 43 runs from the left to the right (as seen from the side BS). The overall machine can again be regarded as a combination between a combing unit K with a drafting unit S, with the unit S comprising a coiler.

Figure 13:
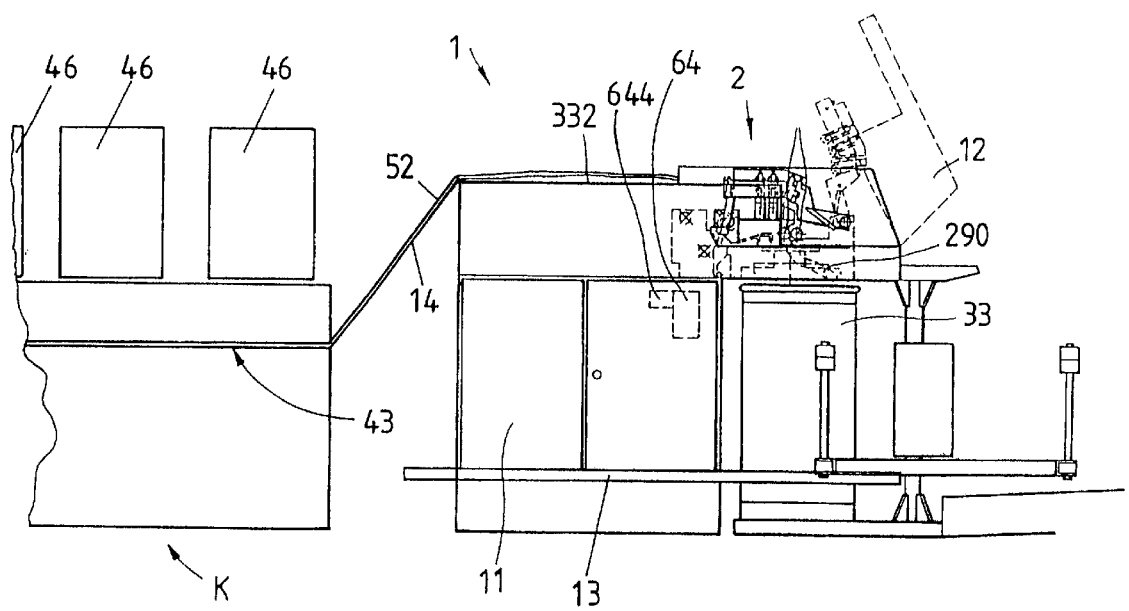
FIG. 13 shows a schematic representation of an embodiment in accordance with the present invention.

FIG. 13 now shows an embodiment of the invention in the form of a combination of a combing unit L according to FIG.

Figure 2:
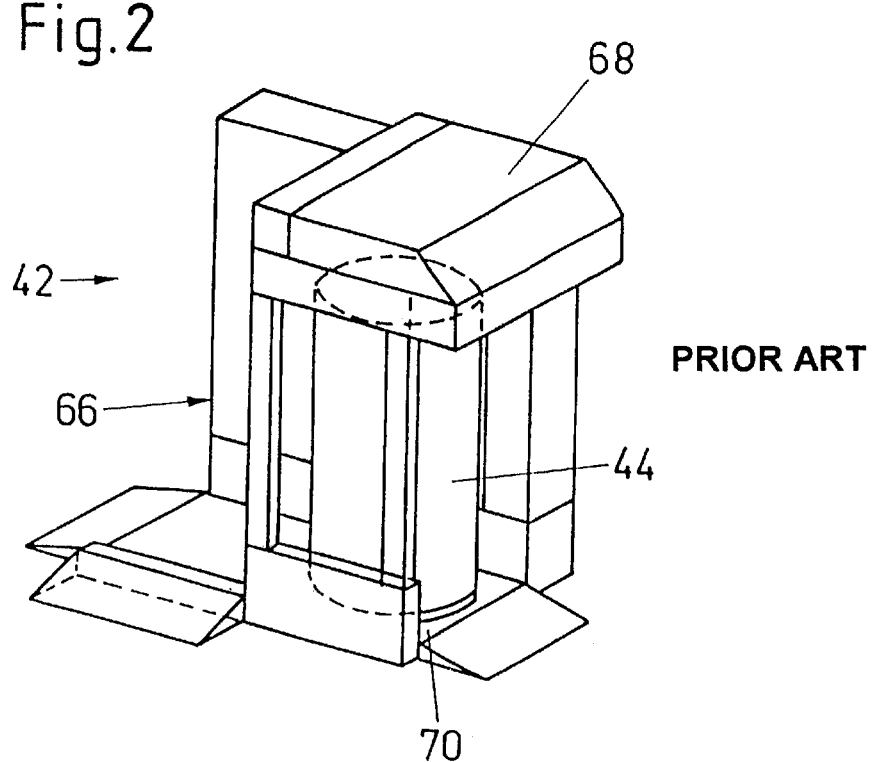
FIG. 2 shows a schematic isometric representation of a coiler for a carding machine according to FIG. 1.

12 with a draw frame 1 (without a can creel) according to FIG. 2. A ramp 14 guides the slivers 52 from the delivery table 43 of unit K to the feed table 332 of the draw frame 1. As a result it is possible to use the same subassembly of the draw frame both for the draw frame per se as well as for the carding machine and for the combing machine. The direction of material flow of the combing unit K is adjusted in such a way to that of the draw frame that the two units are now provided with a common operating side.

Figure 15:
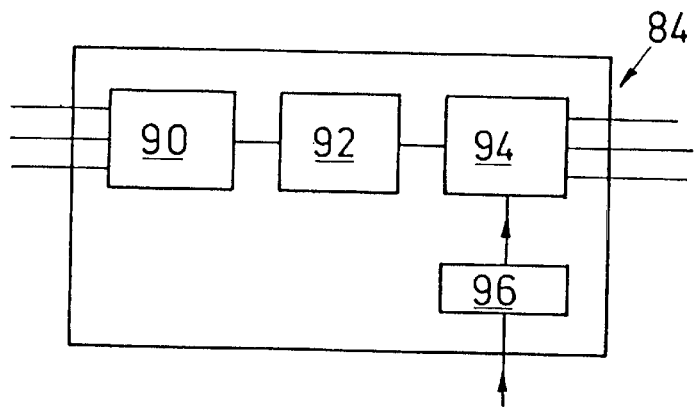
FIG. 15 shows a detail of FIG. 14.

FIG. 14 now schematically shows a variant, with reference numeral 82*a* indicating the casing of an end section of the combing unit K. Reference to the drive for the combing heads 41 (not shown in FIG. 14) is made with the reference numeral 81. Reference is hereby made to the embodiment of FIGS. 5 and 6 in a carding machine where the same reference numerals were used for the same elements. In a cost-effective embodiment, this drive 80 comprises a continuously controllable maintenance-free asynchronous motor 83 (e.g. a squirrel-cage induction motor) which is supplied with electric power by means of a frequency converter 84. The output frequency of the converter 84 is adjustable via an input device 86 which is integrated in a programmable control unit 88 of the combing machine. Such an arrangement currently general state of the art for the combing machine, i.e. the elements 81,83,84,86 and 88 (or their equivalents) are virtually mandatory for a modern combing machine. The converter 84 usually comprises a rectifier 90 (FIG. 15) which receives alternating current from a three-phase mains and supplies direct current to an intermediate circuit 92. A controllable power unit 94 converts the direct current from the intermediate circuit 92 into alternating current with a frequency which is determined by a converter control unit on the basis of a signal from unit 88. This alternating current (single-phase or three-phase) is supplied to motor 83.

The synchronous speed of the motor 83 is predefined definitely by the output frequency of the frequency converter 84. The effective speed of the motor shaft is not determined by the dependence on this synchronous speed alone. This speed also depends on the load to which the motor is subjected, meaning that a so-called "slip" arises in motor 83 between the rotor and the stator. This fact alone would not lead to any problems if the slip were foreseeable.

Figure 16:
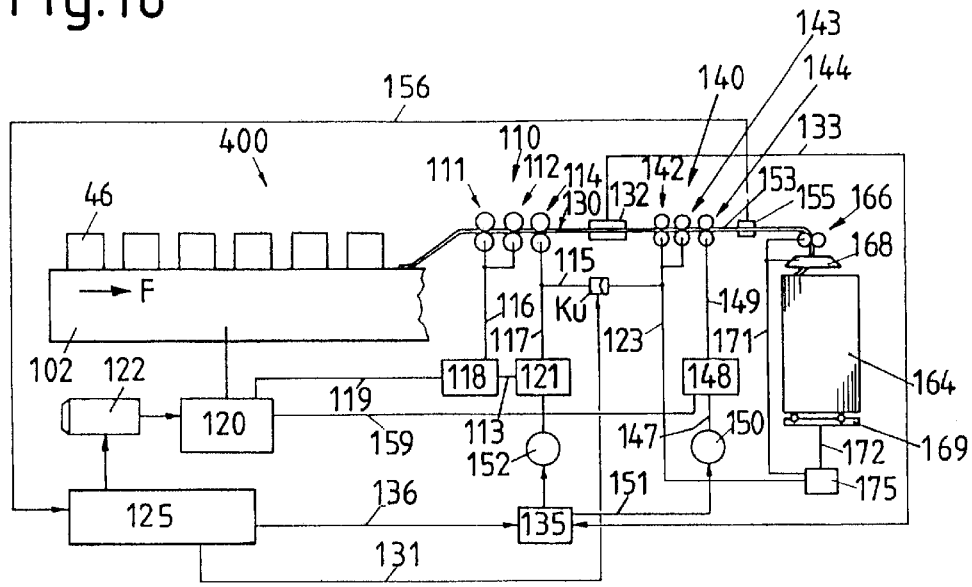
FIG. 16 shows a copy of FIG. 1 of EP-A-799 916.

Although the slip is not controllable, the "slip behaviour" (i.e. the progress of the change of the slip depending on changes in load) can be estimated both in the direction as well as in the magnitude. The frequency converter 84 is usually designed in such a way that it is capable of also supplying the drafting arrangement and the coiler 53 (FIG. 12) with the required power. It is therefore no problem to take the power required for an "autonomous" draw from the output of the converter via a socket 99 of the casing 82*a* for example and to supply the power via a cable 98 to a drive motor 100 of the draw frame 1. The motor 100 is a simple rotary current gear motor which, similar to motor 83, is controlled directly by the power obtained from the frequency converter. The draft in drafting arrangement 2 is fixedly predefined, but can still be adjusted if necessary. Changes in draft can be produced by change gear wheels in the gears. FIG. 16 shows a combing machine known from EP-A-799 916 with a controlled drafting arrangement. The longitudinal part 102 of the combing machine 400 is shown in FIG. 16 on which wound laps 46 for unwinding and combing by downstream combing device are situated. Usually, eight such wound laps are supplied to a combing machine for unwinding. The slivers formed in the individual combing heads are joined in the longitudinal part 102 into a sliver bunch and supplied in the conveying direction F to a first drafting arrangement 110. The slivers supplied by the individual combing heads are usually provided with a sliver count or sliver mass of 8 g/m, as a result of which the sliver bunch consists of eight slivers with a mass of 64 g/m. This sliver mass is subjected in drafting arrangement 110 to a five-fold draft for example, as a result of which the fibre mass as supplied by drafting arrangement 110 is reduced to approx. 12 g/m.

The drafting arrangement 110 is provided with a known preliminary draft between the pairs of drafting rollers 111 and 112. The main draft is performed between the pairs of drafting rollers 112 and 114. The draft ratios (preliminary draft) between the pairs of drafting rollers 111 and 112 are set in a fixed way, whereas the main draft between the rollers 112 and 114 is controlled via a control device according to a signal of a downstream measuring member 132. The drafting rollers 111 and 112 are driven via a schematically shown drive train 116 by a gear 118 with fixed transmission ratios. The gear 118 is connected with a main gear 120 via a drive train 119, which gear is driven by a motor 122. The motor 122 is driven by a control unit 125. The output rollers 114 of the drafting arrangement 110 are driven by a differential gear 121 via a drive train 117, which gear is connected with gear 118 via the drive train 113. In order to perform the control intervention (change of main draft), the differential gear which is driven at a constant speed via the drive train 113 can be overridden by a servo-motor 152. The servo-motor 152 obtains its control pulses from a control unit 135 which is triggered on the basis of a predetermined setpoint value in comparison with the actual value (fibre mass) as determined by the measuring member 132.

The nonwoven 128 which is supplied from the first drafting arrangement 110 is joined into a sliver 130 and is supplied to the measuring member 132. The cross section of the formed sliver 130 can have a round, oval or even rectangular shape, with other shapes being possible. The measuring member 132 can either be of mechanical design (e.g. grooved rollers) or operate on the basis of electronic scanning. Such measuring members are disclosed in various embodiments by the known state of the art. The signal of the measuring member 132 is supplied via a path 133 to a control unit 135 which is connected via a path 136 with the control unit 125. The control unit 135 could also be directly integrated in the control unit 125.

The sliver 130 coming from the measuring member 132 is supplied to a further drafting arrangement 140 which is provided with a control device. The drafting arrangement 140 consists of a pair of input rollers 142 which performs a fixedly set preliminary draft with a pair of rollers 143. The drive of these two pairs of rollers is performed by a differential gear 121 via a drive train 115, a coupling KU and a drive train 123. A detailed illustration of respectively necessary mechanical transmissions was omitted for reasons of clarity of the illustration. This drive connection ensures that the speed of the pair of output rollers 114 of the first drafting arrangement 110 and the pair of input rollers 142 of the drafting arrangement 140 are adjusted to one another, so that both pairs of rollers revolve with approximately the same circumferential speed, meaning that there is a mechanical coupling between these two pairs of rollers 114 and 142 which ensures synchronism. A certain tensional draft between the two pairs of rollers 114 and 142 can be present. A differential gear 148 is driven by gear 120 via the drive train 159, which gear drives on its part the pair of output rollers 144 of the drafting arrangement 140 via a drive train 149. In order to perform the control intervention, the differential gear 148 is connected with a servo-motor 150 via a drive train 147, which motor can intervene in a regulating manner in the drive of the differential gear 148. This means that the drive via the drive train 149 is respectively corrected or overridden.

The servo-motor 150 receives its control pulses via the path 151 from the control unit 135 through which the aforementioned processing of the measuring signal of the measuring device 132 is performed. It is tried to balance the short-wave fluctuations in mass (e.g. piecing places) and to compensate the deviations from a predetermined tolerance range. This means that efforts are made towards the production of an even sliver. The control interventions will be made when the determined peaks of the short-wave fluctuations in mass exceed the predetermined tolerance range. The control signal is then supplied via path 151 from control unit 135 to servo-motor 150. The sliver discharged from drafting arrangement 140 is guided through a measuring member 155 which is connected with the control unit 125 via a path 156. A monitoring of the fibre mass of the sliver is performed in this measuring member again and the machine is cut off in the case of any deviation from the setpoint value. Such measuring members are also known and disclosed by the state of the art. The sliver 153 is thereafter transferred to a depositing apparatus and deposited by means of respective units in a can 164. These units concern a pair of calender rollers 166 for example which supply a sliver to a funnel wheel 168. From the funnel wheel the sliver reaches can 164 and is deposited there in a looped manner. The pair of calender rollers 166, the funnel wheel 168 and a can drive regulator 169 are driven by an intermediate gear 175 via the drive trains 171 and 172. The intermediate gear 175 is connected with the gear 121 via the drive trains 123, 115 and 117 as well as via the coupling KU. As a result of this drive connection the drive of the depositing apparatus 166, 168, 169 follows the changeable speed of the differential gear 121. This ensures a continuous deposit of the sliver without having to provide any complex and malfunction-prone intermediate storage means.

As has already been described above, the sliver formed after the drafting arrangement 110 is provided with a fibre mass of 12 g/m. The draft in the downstream autoleveller 140 is arranged in such a way that the sliver deposited in the can 164 is provided with a mass of 5 g/m.

Figure 17:
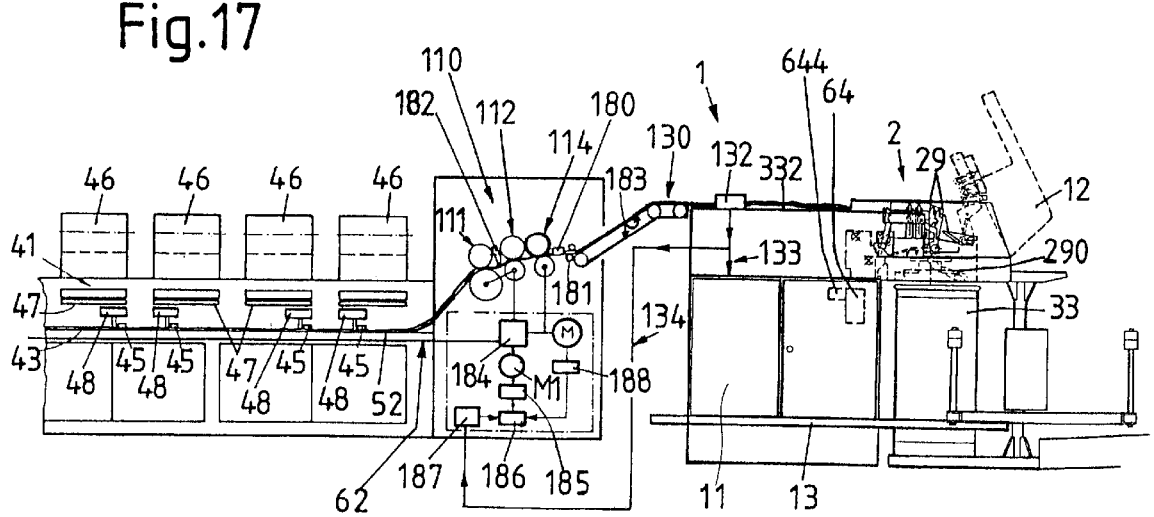
FIG. 17 shows a schematic representation of a further embodiment according to the present invention.

FIG. 17 now shows a further development of the machine according to FIG. 16 in order to form a combination according to the present invention. Principally, a combing machine with a controlled drafting arrangement in accordance with EP-A-376 002 is presumed. FIG. 17 shows a combing machine with eight combing heads 41 for example, whereon the illustration only shows four. Each combing head 41 is assigned a respective wound lap 46 whose lap is supplied to the combing apparatuses 41 by way of a feed device (not shown in closer detail). The combing apparatus 41 is not shown in closer detail and can consist, as is generally known, of a nipper unit, a circular comb situated below the same and a top comb situated behind the nipper unit as seen in the conveying direction with downstream detaching rollers.

The nonwoven supplied by the detaching rollers reaches a draw-off funnel (not shown in closer detail) via a delivery table 47. In the draw-off funnel the nonwoven is joined into a sliver or combed sliver. This process is supported by a pair of take-off rollers 48 which are provided downstream of the respective draw-off funnel, which pair of rollers supplies the combed sliver to the delivery table 43. In order to further convey the slivers 52 adjacent to one another on the delivery table 43, sliver guide means 45 are provided which are mutually offset in the horizontal direction. The slivers 52 which are guided parallel to each other reach a drafting arrangement 110 with input rollers 111 of a preliminary drafting zone which is limited by a pair of central rollers 112. The pair of rollers 112 are used as feed rollers for a downstream main drafting zone. The drafted slivers reach a schematically shown sliver funnel 180 via the delivery rollers 114 at the outlet of the main drafting zone and are joined there into a combed sliver by using the take-off rollers 181. In order to guide the fibres, a compression member 182 is provided in the preliminary drafting zone. Said compression member 182 could also be arranged in the main drafting zone.

The combed sliver 130 supplied by the take-off rollers 114 reaches a conveyor belt 183 which supplies the sliver directly to the feed table 332 of a draw frame subassembly in accordance with FIG. 3. The feed table 332 is provided in this case with a sliver thickness sensor 132 (cf. FIG. 16). The sensor 132 supplies a single measuring signal which can be regarded as a composite signal with substantially two "signal parts", namely a first part which corresponds to the sliver count and a second part which corresponds to the short-term fluctuations in the sliver thickness. The latter comprises signal components which originate from the so-called piecings which are produced during the combing. As a result of the doubling of the slivers 52, which is performed on table 43, the effect of the piecings on the evenness of the sliver has been reduced, but not eliminated.

Draw frame 1 is an autoleveller draw frame, meaning that it is provided with a variable draft. The draft can be changed depending on the output signal of the sensor 132 in order to improve the evenness of the sliver at the output of the drafting arrangement as compared with the feed. As is schematically indicated with the connecting line 133, the output signal of the sensor 132 is supplied to the control devices (not shown) of the draw frame subassembly 1, with said devices comprising a suitable analysing system in order to convert the pertinent signal components into control signals for the drafting arrangement drive. This shall not be discussed herein in closer detail, because suitable means are known in the RSB draw frame of Rieter Ingolstadt and can be used without any changes being required. Control can be designed in such a way that it compensates for short-term fluctuations in sliver thickness.

The drafting arrangement 110 is also provided with a control device which is supplied with the output signal of the sensor 132 by way of the connecting line 134. The drive of the lower rollers of the pair of rollers 111, 112 and 114 is performed by the main motor M, with a planetary gear 184 being interposed for the drive of the bottom roller 112 and the drive of the bottom roller 111 being taken directly from the bottom roller 112. The planetary gear 184 is associated with a servo-motor M1 which is controlled by a control device 185. The control device 185 receives pulses from a setpoint module 186 in which the measuring signal supplied by the measuring device 132 via a signal converter 187 is compared with a control signal emitted by the control tachometer 188 of the main motor M. A setpoint value for the control device is derived from the comparison.

If a difference to the setpoint sliver thickness is determined by the measuring device 132, the servo-motor M1 is triggered by way of the control device, which motor intervenes in the planetary gear and causes a change in the speed of the middle roller 112 and thus also the input roller 111, whereas the delivery roller 114 still has an unchanged speed. This means that due to the changed difference in speed between the middle roller 112 and the delivery roller 114 the draft is adjusted to the determined sliver thickness by the measuring device 132. This regulation only reacts to long-term changes in the sliver thickness, i.e. it is only used for maintaining the sliver count and to compensate for drift phenomena. The control drive for the drafting arrangement 110 therefore only needs to adjust relatively slowly to changes in the sliver thickness.

It is therefore possible to connect the servo-drive of the drafting arrangement with the drive shaft (cf. FIG. 16) for the combing heads, i.e. the operating speed of the combing unit K can be changed in its entirety to produce a variable draft in the drafting arrangement 110. This is indicated schematically in FIG. 17 by a connection of the shaft 62 with the aforementioned planetary gear 184. The drive concept can be revised in the event of any integration in the drive of the machine.

By joining the slivers 52 into a sliver 130 adjusted according to the desired (predetermined) sliver count it is possible to design the (subassembly of) draw frame 1 towards short-term fluctuations. In this way the recognition of the very short fluctuations is simplified which are caused by the piecings. Two sensors could be provided for this purpose, with one sensor being connected with the control device of the drafting arrangement 110 and the other with the control device of the draw frame subassembly. The first sensor can be designed for recognising fluctuations in sliver count and the second for recognising short-term fluctuations.

What is claimed is:

1. A machine for processing textile material with at least one sliver-forming device and a coiler and at least one drafting arrangement between the sliver forming device and the coiler, characterized in that the coiler is formed by a subassembly of a draw frame for doubling and drafting slivers, with the subassembly also comprising the drafting arrangement of the draw frame, the machine for processing textile material being a carding machine or a carding device, a drive of sliver-supplying elements of the carding machine or carding device and at least a drive of the drafting arrangement of the draw frame comprise at least one frequency controlled rotary current motor, and a common frequency converter for supplying the rotary current motors, and a cut-out switch and electric choke member provided between the frequency converter and rotary current motor of the drafting arrangement.

2. The machine for processing textile material as in claim 1, wherein the choke member is arranged parallel to a further cut-out switch in a feed line from the frequency converter to the rotary current motor of the drafting arrangement.

3. A machine for processing textile material with at least one sliver-forming device and a coiler and at least one drafting arrangement between the sliver forming device and the coiler, characterized in that the coiler is formed by a subassembly of a draw frame for doubling and drafting slivers, with the subassembly also comprising the drafting arrangement of the draw frame, the machine for processing textile material being a carding machine or a carding device, a drive of sliver-supplying elements of the carding machine or carding device and at least a drive of the drafting arrangement of the draw frame comprise at least one frequency controlled rotary current motor, and a common frequency converter for supplying the rotary current motors, and a cut-out switch provided in a feed line from the frequency converter to the rotary current motor of the drafting arrangement, and means provided in the frequency converter for controlling the supply of current to the rotary current motor of the drafting arrangement.

4. A machine for processing textile material, comprising:

at least one sliver-forming device;

a coiler;

at least one drafting arrangement operably disposed between said sliver-forming device and said coiler;

said coiler and said drafting arrangement contained in an autonomous draw frame subassembly having an independent frame, drafting arrangement drive, and operating devices; and wherein said subassembly is an independently positionable module with respect to said sliver forming device.

5. The machine for processing textile material as in claim 4, wherein said drafting arrangement has a delivery speed in excess of 400 m/min.

6. The machine for processing textile material as in claim 4, wherein said drafting arrangement is an evening unit.

7. The machine for processing textile material as in claim 4, wherein said draw frame subassembly further comprises a feed table having at least one sliver guide element.

8. The machine for processing textile material as in claim 4, wherein said sliver forming device is a combing machine.

9. The machine for processing textile material as in claim 4, wherein said sliver forming device is one of a carding machine and carding device.

10. The machine for processing textile material as in claim 9, wherein said drafting arrangement has an overall draft of at least 2.

11. The machine for processing textile material as in claim 10, wherein said drafting arrangement has an overall draft of between about 3 to about 6.

12. The machine for processing textile material as in claim 9, wherein said carding machine or carding device produce a sliver with a thickness in excess of 8 ktex.

13. The machine for processing textile material as in claim 9, wherein said drafting arrangement is designed for drafting a plurality of slivers.

14. The machine for processing textile material as in claim 9, wherein said carding machine or carding device comprises sliver-supplying devices having a drive, said drive and said drafting arrangement drive comprising frequency controlled motors, and further comprising a common frequency converter for supplying said motors.

15. The machine for processing textile material as in claim 14, further comprising a cut-out switch and an electric choke member operably disposed between said frequency converter and said drafting arrangement motor.

16. The machine for processing textile material as in claim 15, wherein said choke member is arranged parallel to a further cut-out switch in a feed line from said frequency converter to said drafting arrangement motor.

17. The machine for processing textile material as in claim 14, further comprising a cut-out switch disposed in a feed line from said frequency converter to said drafting arrangement motor, and means provided in said frequency converter for controlling the supply of current to said drafting arrangement motor.

18. The machine for processing textile material as in claim 4, wherein said sliver forming device is a carding machine having a working width of at least 1,200 mm.

19. The machine for processing textile material as in claim 4, wherein said coiler is configured for changing cans on the fly.

20. The machine for processing textile material as in claim 4, wherein said sliver forming device is a combing machine, and further comprising a transfer ramp disposed between a delivery table of a combing unit and a feed table of said draw frame subassembly.

21. The machine for processing textile material as in claim 20, wherein said transfer ramp comprises a driven conveying device.

22. The machine for processing textile material as in claim 4, wherein said sliver forming device is a combing machine having a first drafting arrangement disposed to supply sliver to said drafting arrangement.

23. The machine for processing textile material as in claim 22, wherein said first drafting arrangement is driven by a drive for said combing machine.

24. The machine for processing textile material as in claim 22, wherein said combing machine has a drive, said drive and said drafting arrangement drive comprising frequency controlled motors, and further comprising a common frequency converter for supplying said motors.

25. The machine for processing textile material as in claim 4, wherein said sliver forming device is a combing machine, said drafting arrangement configured for drafting a plurality of slivers.

* * * * *